United States Patent
Pustizzi

(10) Patent No.: US 11,055,675 B2
(45) Date of Patent: Jul. 6, 2021

(54) SYSTEMS AND METHODS FOR E-CERTIFICATE EXCHANGE AND VALIDATION

(71) Applicant: XSPERO U.S., Millville, NJ (US)

(72) Inventor: Kenneth Pustizzi, Milmay, NJ (US)

(73) Assignee: XSPERO U.S., Millville, NJ (US)

( * ) Notice: Subject to any disclaimer, the term of this patent is extended or adjusted under 35 U.S.C. 154(b) by 16 days.

(21) Appl. No.: 16/406,701

(22) Filed: May 8, 2019

(65) Prior Publication Data

US 2019/0347624 A1  Nov. 14, 2019

Related U.S. Application Data

(60) Provisional application No. 62/668,313, filed on May 8, 2018, provisional application No. 62/681,701, filed on Jun. 7, 2018.

(51) Int. Cl.

| | |
|---|---|
| *G06Q 40/00* | (2012.01) |
| *G06Q 20/04* | (2012.01) |
| *G06F 16/23* | (2019.01) |
| *G06Q 20/32* | (2012.01) |
| *G06Q 20/40* | (2012.01) |
| *G06Q 20/38* | (2012.01) |

(52) U.S. Cl.
CPC ..... *G06Q 20/0457* (2013.01); *G06F 16/2379* (2019.01); *G06Q 20/322* (2013.01); *G06Q 20/389* (2013.01); *G06Q 20/4016* (2013.01)

(58) Field of Classification Search
CPC .............. G06Q 20/0457; G06Q 40/00; G06Q 20/4016; G06Q 20/389; G06F 16/2379

USPC .......................................................... 705/44
See application file for complete search history.

(56) References Cited

U.S. PATENT DOCUMENTS

| 9,892,460 B1 * | 2/2018 | Winklevoss | ........... G06Q 40/04 |
| 10,022,613 B2 * | 7/2018 | Tran | ...................... A63B 71/145 |
| 10,046,228 B2 * | 8/2018 | Tran | ...................... A61B 5/0022 |

(Continued)

OTHER PUBLICATIONS

Distributed Ledger Technologies for Developing Asia Ferrarini, Benno; Maupin, Julie; Hinojales, Marthe. ADB Economics Working Paper Series; Manila, Dec. 20, 2017. (Year: 2017).*

(Continued)

*Primary Examiner* — Lalita M Hamilton
(74) *Attorney, Agent, or Firm* — Hunton Andrews Kurth LLP

(57) ABSTRACT

Systems and methods described herein include first and second devices including one or more processors and memory, the first device being configured to purchase one or more certificates by a first process via one or more blockchain transactions. The second device may be in communication with the first device, and may be redeem the one or more certificates received by a second process via one or more blockchain transactions. The second device may exchange one or more codes to designate the one or more certificates as used on the first device. The system may include one or more servers in communication with the second device, and may be automatically generate a message containing updated redemption information of the one or more certificates when the updated redemption information has been stored in one or more databases, which may be in communication with the one or more servers.

13 Claims, 15 Drawing Sheets

(56) References Cited

U.S. PATENT DOCUMENTS

| | | | |
|---|---|---|---|
| 2013/0151401 A1 | 6/2013 | Scipioni et al. | |
| 2014/0201057 A1* | 7/2014 | Shuster | G06Q 20/065 |
| | | | 705/37 |
| 2016/0267474 A1 | 9/2016 | Lingham et al. | |
| 2016/0275461 A1* | 9/2016 | Sprague | G06Q 20/0655 |
| 2017/0200147 A1 | 7/2017 | Ansari | |
| 2017/0228734 A1* | 8/2017 | Kurian | G06Q 10/105 |
| 2017/0243208 A1* | 8/2017 | Kurian | G06Q 20/40 |
| 2017/0244721 A1* | 8/2017 | Kurian | H04L 63/105 |
| 2017/0250815 A1* | 8/2017 | Cuende | G06Q 20/401 |
| 2017/0364908 A1* | 12/2017 | Smith | G06Q 20/023 |
| 2017/0364936 A1 | 12/2017 | Balfour et al. | |
| 2018/0082290 A1* | 3/2018 | Allen | H04L 9/3263 |
| 2018/0082291 A1* | 3/2018 | Allen | G06Q 20/38215 |
| 2018/0101844 A1 | 4/2018 | Song et al. | |
| 2018/0227293 A1* | 8/2018 | Uhr | G06Q 20/36 |
| 2019/0005470 A1* | 1/2019 | Uhr | H04L 9/3265 |
| 2019/0104196 A1* | 4/2019 | Li | G06F 16/2379 |
| 2019/0108517 A1* | 4/2019 | Rose | G06Q 20/3829 |

OTHER PUBLICATIONS

Notification of Transmittal of The International Search Report and The Written Opinion of the International Searching Authority from Application No. PCT/US2019/031320 dated Aug. 22, 2019.

Notification Concerning Transmittal of International Preliminary Report on Patentability and Written Opinion of the International Searching Authority from Application No. PCT/US2019/031320 dated Nov. 19, 2020.

* cited by examiner

SYSTEMS AND METHODS FOR E-CERTIFICATE EXCHANGE AND VALIDATION

PRIORITY

The present application claims priority to U.S. Provisional Patent Application Ser. No. 62/668,313, filed on May 8, 2018, entitled "Systems and Methods for E-Certificate Exchange and Validation", and U.S. Provisional Patent Application Ser. No. 62/681,701, filed on Jun. 7, 2018, entitled "Systems and Methods for Centralized E-Certificate Exchange and Validation," the disclosures of each which are incorporated by reference in its entirety.

BACKGROUND OF THE INVENTION

The present invention relates generally to the field of e-certificate systems, devices and methods, and specifically to the exchange and validation of e-certificates, e-coupons, e-tickets, tokens, coins, and other e-currency and e-monetary mediums of exchange by a central exchange server.

Consumers have minimal motivation to accept existing reward programs; most have very low proportional returns. Other reward programs with high levels of return adversely impact pricing points of retailers and are not sustainable. In addition, certificates are often difficult to track and monitor. Once lost, the consumer loses track of them. In such a case, the retailer may fail to document the use of the certificate.

These and other deficiencies exist.

SUMMARY OF THE INVENTION

In an example, a system may include first and second devices including one or more processors and memory, wherein the first device is configured to purchase one or more certificates by a first process via one or more blockchain transactions. The second device may be in communication with the first device, and may be configured to redeem the one or more certificates received from the first device by a second process via one or more blockchain transactions. The second device may be configured to exchange one or more codes to designate the one or more certificates as used on the first device. The system may include one or more servers in communication with the second device, and may be configured to automatically generate a message containing updated redemption information of the one or more certificates when the updated redemption information has been stored in one or more databases. The one or more databases may be in communication with the one or more servers.

In an example, a method may comprise the steps of: establishing communication between a first device including one or more processors and memory and a second device including one or more processors and memory, wherein the first device is configured to purchase one or more certificates by a first process via one or more blockchain transactions; redeeming, by the second device, the one or more certificates received from the first device by a second process via one or more blockchain transactions; exchanging, by the second device, one or more codes to designate the one or more certificates as used on the first device; and generating, by one or more servers in communication with the second device, a message containing updated redemption information of the one or more certificates when the updated redemption information has been stored in one or more databases, the one or more databases in communication with the one or more servers.

DETAILED DESCRIPTION

Figure 1A:
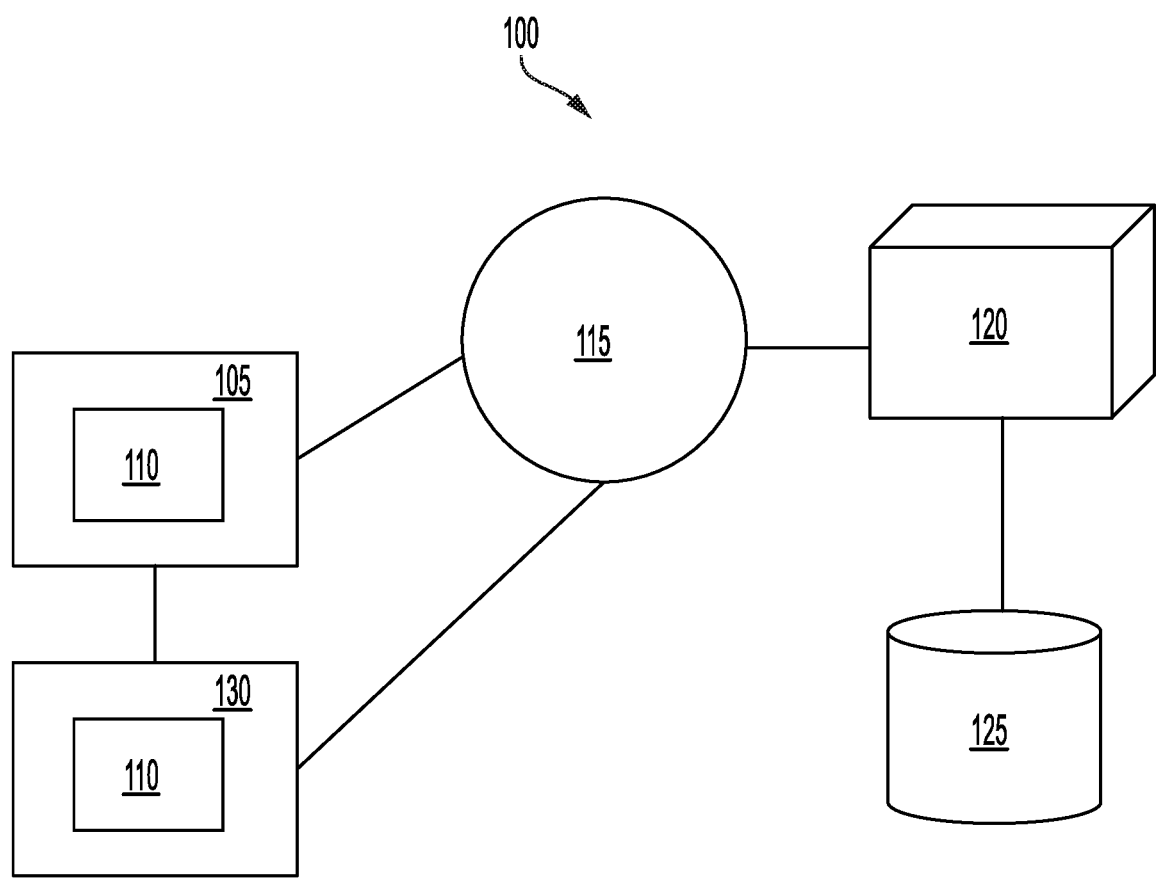
FIG. 1A illustrates a system according to an exemplary embodiment.

This application will become more fully understood from the following detailed description, taken in conjunction with the accompanying figures. Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting. Alternative exemplary embodiments relate to other features and combinations of features.

The disclosed systems and methods for performing e-certificate exchange and validation provide enhanced security and auditability by processing the authenticity of the e-certificate in a centralized exchange server in association with the blockchain to aid in immutability and auditability. According to at least one embodiment, the system includes a central exchange server that is configured to validate the authenticity and exchange of electronic mediums of exchange and/or e-currency between consumers and sellers, including one or more charities, by the transfer of one or more security codes between same or different devices. Electronic mediums of exchange and/or e-currency may comprise one or more e-certificates, e-coupons, e-tickets, tokens, coins and other e-monetary mediums of exchange. The ability for rapid validation of exchange of electronic mediums of exchange is achieved by passing one or more security codes between one or more mobile devices. Data (including transaction data, and/or blockchain transaction data) associated with the electronic medium exchange is provided to a database, such as a cloud-based database, where the history of the electronic medium exchange is maintained, and immutably on the blockchain, which may be configured to perform one or more processes, including determination of distribution of funds to one or more charities. Upon validation of the electronic medium exchange, the cloud-based database may or may not be configured to be linked back, via one or more application programming interfaces, to a seller, such as linked back to an enterprise business system of the seller, in order to process and distribute funds as appropriate.

By creating validated electronic medium exchanges between the devices with an application, special incentives may be rapidly created so as to better target customers via one or more reports. The tracking process of the one or more certificates, including having data flow back to the database and blockchain, may provide enhanced control for the merchant through reporting that may be used to verify booked transactions. By validating and tracking the certificates, repeated use of the electronic medium of exchange is prevented.

In some examples, leveraging high margin products and/or services increases the amount available, such as advertising for lower margin products at, including but not limited to, grocery store products. As a consequence, this increases the amount available for charities or consumer savings to much higher levels. Consumer savings are much higher, for example 10-30% higher than other programs, which are conventionally only a few percent. The higher consumer savings, or donation to a charity, may be the result of leveraging the high variable margin of a media company and advertising sales to provide one or more certificates to those with lower variable margins. Unlike existing programs with high levels of return to consumers that adversely impact the price points of retailers, the original price points of the retailers is maintained. Consumers may be rewarded with savings or loan reduction or charitable contribution. This allows for simple engagement and tracking between consumers and retailers. Moreover, the system may be configured to apply to other forms of exchange, such as a retailer's existing gift card program. It is envisioned that the system may be applied to other applications, including but not limited to buying and selling tickets; exchanging tickets for transportation; and using passive NFC self-guided tours launching videos or other information.

For example, a consumer may purchase one or more electronic mediums of exchange, such as an e-certificate, which initiates the tracking process. A back end system and the blockchain may be configured to track all history, including the exchange and validation of the e-certificate. When the e-certificate is presented on a mobile device of the consumer, the seller, via a representative, uses a mobile device or some other redemption method to exchange security codes to designate the e-certificate as used on the mobile device of the consumer. This information resides on the mobile device of the consumer and is provided to the back end system for tracking. The history is then provided to the database. The history remains available to the seller. For example, the seller may receive one or more parameters, such as the income associated with a customer, shopping or transaction history data associated with the customer, and may also collect other data associated with customer, including but not limited to the day and/or time when the customer registers. Based on this information obtained by the seller, the seller may modify marketing and incentive programs to maximize future sales to this customer. One or more application programming interfaces (APIs) may be utilized to integrate with an accounting system associated with the seller.

By utilizing blockchain to transfer ownership between different consumers, a young adult may purchase the e-certificates and then transfer ownership to other entities, such as parents or grandparents. The savings generated may be split between the consumers, or it could be given exclusively and/or completely to only a single consumer, for example, to pay off a grandchild's student loans. In at least this manner, blockchain enables a multi-level system for e-certificates. In some examples, a web-based system may be configured to assign merchants to media companies, and to enable them to create one or more certificates for sale. In addition, the system may be configured to generate and transmit a report associated with the status of the one or more certificates, including identity of the purchaser, and customer data. In some examples, the media companies may propose the one or more certificates which may be interested via a web browser into the interface to a relational database. The merchant may approve the one or more certificates, which are then approved for creation on the blockchain via the server and relational database. In addition, the system may be configured to permit the onboarding and integration of a charity. Further, the web-based system may be configured to enable a charity to report on the status on the consumers and/or supporters and the current financial benefits.

As further explained herein, asynchronous purchase and redemption may be used to overcome problems, including those with the blockchain. In other examples, synchronous purchase and redemption processes may be used. For example, the blockchain does not return a completed transaction instantaneously due to busy traffic and other systems issues. This results in poor user experience, and also extended wait times or time out failures. Moreover, longer processing and transaction times do not permit the systems and methods to efficiently operate, particularly in light of longer transaction processing cycle times associated with certain blockchain systems such as Bitcoin processing. The systems and methods disclosed herein have been developed to asynchronously purchase and redeem one or more certificates that are verified live on the blockchain, and the systems and methods disclosed herein allow the one or more certificates to be purchased or redeemed while the blockchain catches up.

FIG. 1A illustrates a system 100 configured to perform e-certificate exchange and validation provide enhanced security by processing the authenticity of the e-certificate in a centralized exchange server according to an example of the present disclosure. As further discussed below, system 100 may include first device 105, network 115, server 120, database 125, and second device 130. Although FIG. 1A illustrates single instances of the components, system 100 may include any number of components, including one or more processors.

As shown in FIG. 1A, first device 105, or client or consumer or user device 105, may be a network-enabled computer associated with a user. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. Client device 105 also may be a mobile device; for example, a mobile device may be a smart phone, a laptop computer, a tablet computer, a wearable device, and/or any other like mobile device or portable computing device. In some examples, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

In various examples according to the present disclosure, client device 105 of system 100 may execute one or more applications 110, such as software applications, that enable, for example, network communications with one or more components of system 100 and transmit and/or receive data. In some examples, an application 110 may be installed on client device 105, such as a mobile device. Application 110 may include instructions to perform e-certificate exchange and validation provide enhanced security by processing the authenticity of the e-certificate in a centralized exchange server 120 as described herein. Application 110 may be configured to create one or more certificates. In some examples, client device 105 may be configured to purchase one or more certificates after they have been created. Client device 105 may be in communication with one or more servers 120 via one or more networks 115, and may operate as a respective front-end to back-end pair with server 120. Client device 105 may transmit, for example from a mobile device application 110 executing on client device 105, one or more requests to server 120. The one or more requests may be associated with retrieving data from server 120. Server 120 may receive the one or more requests from client device 105. Based on the one or more requests from client device 105, server 120 may be configured to retrieve the requested data from one or more databases 125. Based on receipt of the requested data from one or more databases 125, server 120 may be configured to transmit the received data to client device 105, the received data being responsive to one or more requests.

Data associated with the redemption of one or more certificates may be received, captured, or otherwise obtained through a variety of processes. In some examples, information about a certificate may be received by second device 130 from first device 105, including but not limited to, scanners, sensors, cameras, mobile devices, and the like and/or any combination thereof. In some examples, the one or more certificates may be received from local storage within device 105. In some examples, the one or more certificates may be received from a cloud. For example, cloud computing may comprise an Internet connection between the systems that are operating in the cloud. The cloud may comprise a plurality of systems such that one or more shared resources, such as processing, peripherals, software, data, servers, and the like are provided to any system of the cloud so as to allow access and distribution of services and/or data between the systems of the cloud.

Server 120 may include one or more processors, which are coupled to memory. Server 120 may be configured as a central system, server or platform to control and call various data at different times to execute a plurality of workflow actions. Server 120 may be configured to connect to database 125. Server 120 may be connected to at least one client device 105. In some examples, server 120 may be connected to one or more devices 105, 130 via one or more networks 115.

Network 115 may be one or more of a wireless network, a wired network or any combination of wireless network and wired network, and may be configured to connect client device 105 and merchant device 130 to server 120. For example, network 115 may include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth network, or any other wired or wireless network for transmitting and receiving a data signal.

In addition, network 115 may include, without limitation, telephone lines, fiber optics, IEEE Ethernet 802.3, a wireless network, a wide area network (WAN), a wireless personal area network (WPAN), a local area network (LAN), a body area network (BAN), a global network such as the Internet, a cellular network, or any combination thereof. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

In various examples, network 115 may be configured to provide data communication between a client device 105, merchant device 130, and server 120 and between the devices 105 and 130. For example, data may be communicated between devices 105 and 130 and server 120 through the Internet or other network, and data may be communicated directly between devices 105 and 130 and/or one or more databases 125 without passing through server 120. Accordingly, network 115 may be one or more of the Internet, Near Field Communication (NFC), Radio Frequency Identification (RFID), Bluetooth, Wi-Fi, and/or the like. Device 105 and 130 may be same or different devices.

In some examples, second device 130 may comprise a merchant device. In some examples, merchant device may be a network-enabled computer associated with a merchant. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. Second device 130 also may be a mobile device; for example, a mobile device may be a smart phone, a laptop computer, a tablet computer, a wearable device, and/or any other like mobile device or portable computing device. In some examples, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

In various examples according to the present disclosure, second device 130 of system 100 may execute one or more applications 110, such as software applications, that enable, for example, network communications with one or more components of system 100 and transmit and/or receive data. In some examples, an application 110 may be installed on second device 130, such as a mobile device. Application 110 may include instructions to perform e-certificate exchange and validation provide enhanced security by processing the authenticity of the e-certificate in a centralized exchange server 120 as described herein. One or more applications 110 of second device 130 may comprise the same application as the application executed on first device 105. Second device 130 may be in communication with one or more servers 120 via one or more networks 115, and may operate as a respective front-end to back-end pair with server 120. Second device 130 may transmit, for example from a mobile device application 110 executing on client device 105, one or more requests to server 120. The one or more requests may be associated with retrieving data from server 120. Server 120 may receive the one or more requests from second device 130. Based on the one or more requests from second device 130, server 120 may be configured to retrieve the requested data from one or more databases 125. Based on receipt of the requested data from one or more databases 125, server 120 may be configured to transmit the received data to second device 130, the received data being responsive to one or more requests.

Figure 1B:
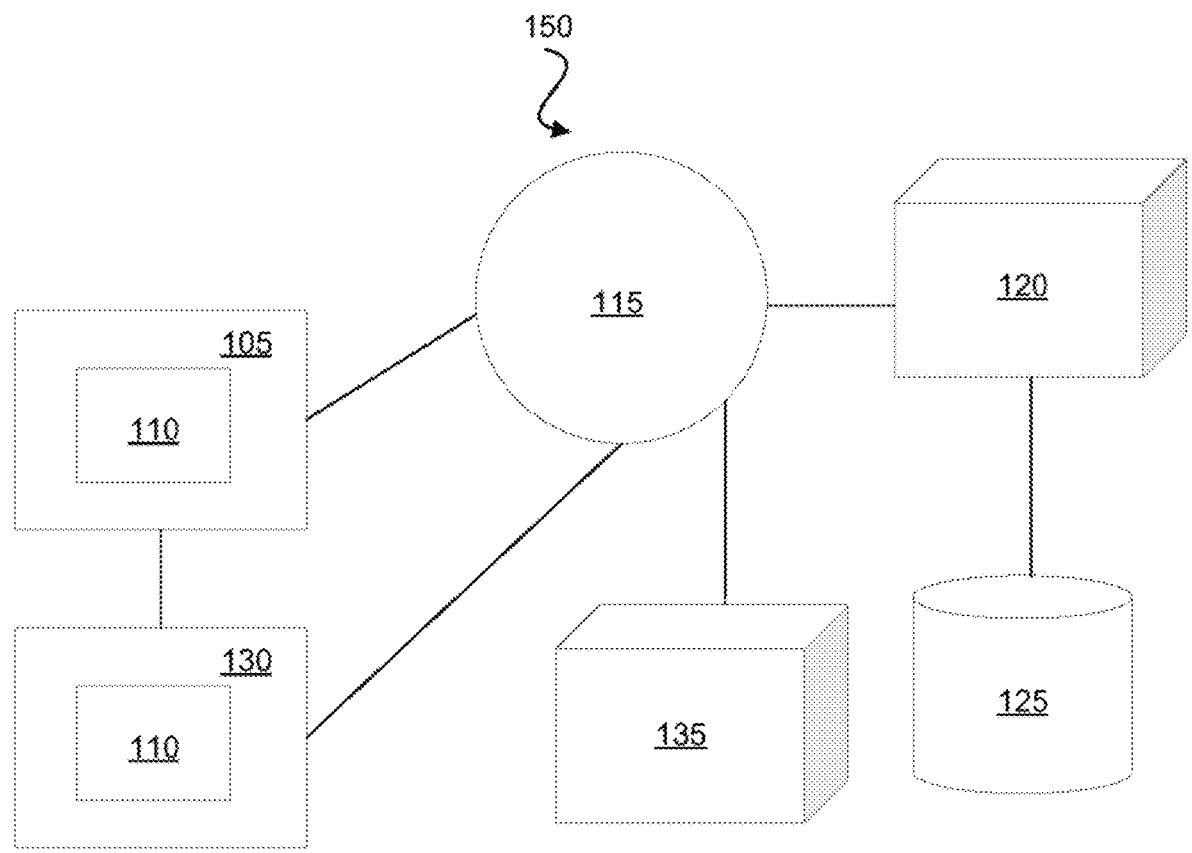
FIG. 1B illustrates a system according to another exemplary embodiment.

FIG. 1B illustrates a system 150 according to another exemplary embodiment. FIG. 1B may reference same or similar components of FIG. 1A. Whereas FIG. 1A may illustrate a system 100 without blockchain to perform the processes described herein, FIG. 1B illustrates a system 150 including a blockchain 135 to perform the processes described herein. In some examples, the blockchain 135 may be configured to perform one or more processes and store data as described herein, including but not limited to fund distribution. In some examples, asynchronous steps may be used as part of FIG. 1B, as detailed further below, whereas FIG. 1A may use one or more synchronous steps without the blockchain. FIG. 1A may replicate the blockchain into a database 125 by having the system 100 perform the one or more transactions disclosed herein, which the database 125 may be checked against.

Figure 2:
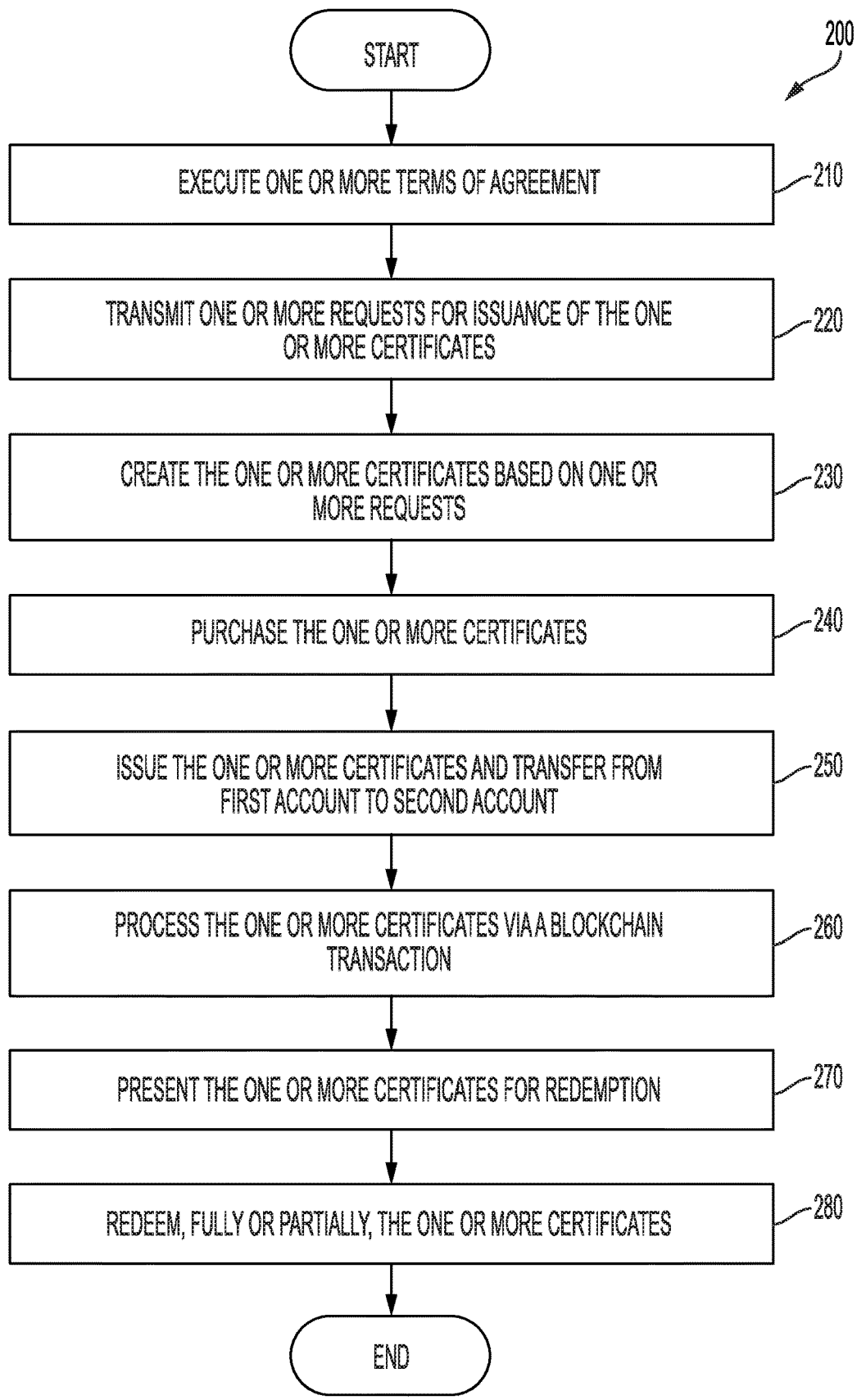
FIG. 2 illustrates a method according to an exemplary embodiment.

FIG. 2 illustrates a method 200 for performing e-certificate exchange and validation provide enhanced security by processing the authenticity of the e-certificate in a centralized exchange server according to an example of the present disclosure. Method 200 may reference same or similar components of FIG. 1A and FIG. 1B. As described herein, the systems and methods described herein may include a plurality of stages, including creation, issuance, and redemption, each associated with one or more transactions. Moreover, at least a portion of the one or more transactions are blockchain transactions. In some examples, all transactions, including but not limited to purchase, transfer and/or redemption of one or more certificates, may comprise blockchain or non-blockchain transactions or any combination thereof.

At block 210, a plurality of entities may enter into one or more contracts, including but not limited to, a merchant and media company or other high margin variable provider may enter into a contract, such as a physical contract. In some examples, the media company and the merchant may enter into a contract for the exchange of advertising; the merchant and the exchange may enter into a contract so as to permit the merchant to use the exchange to sell their certificates; and the media company and the exchange may enter into a contract so as to permit the media company to execute their agreement with the merchant on the exchange. According to the one or more contracts, including between the merchant and media company, one or more terms may be agreed upon, including but not limited to, a number of certificates and their value. The merchant may be associated with one or more of the devices, as explained above with respect to FIG. 1. The media company may be associated with one or more of the devices, as explained above with respect to FIG. 1.

At block 220, the media company may then transmit one or more requests to the one or more servers. In some examples, the one or more servers may be the same as the one or more servers, as explained above with respect to FIG. 1. In some examples, the one or more requests may comprise a request for issuance of one or more certificates for the merchant. For example, the media company may request that the merchant approve the one or more certificates that are being created.

At block 230, responsive to the one or more requests, the one or more servers may create the one or more certificates. The one or more certificates may be included on an exchange. As explained further in FIG. 11, on the blockchain configuration, the one or more certificates may be transferred into a wallet associated with the media company. As explained further in FIGS. 5A and 5B, these are an asset created and transferred on the blockchain. In some examples, this transaction may comprise a blockchain transaction. The blockchain, such as Stellar, may be used as a ledger to view movements of the one or more certificates. In some examples, blockchain may be used as a publicly accessible ledger.

In some examples, the one or more certificates may comprise a numeric code, such as a 16 digit numeric code, and may be randomly generated using a custom random number function to create a 15 digit code and a single check digit, such as Luhn algorithm, which may then be verified against existing certificate codes in the database to ensure its uniqueness. To exchange a certificate, the certificate and the source and the destination user identifiers are taken as inputs, located and verified through a matching process, then updated in the database to reflect the change in ownership, then updated on the blockchain to reflect the change.

In some examples, there may be a plurality of blockchain accounts that are created. By way of example, there may be a Media Company blockchain account, Consumer blockchain account, Merchant blockchain account, Charity blockchain account, and a master blockchain account. In some examples, although these accounts are separate, one or more of these accounts may be combined in any combination to perform the roles and functions via the systems and methods disclosed herein. Additionally, each of these accounts may be configured to perform the roles and functions by another account, in part or in whole. Non-exhaustive roles and functions include but are not limited to: distribution of proceeds to one or more entities or parties; exchanging values of certificate for goods and/or services; asynchronous purchase and redemption of certificates; and authorization of sale of certificates. In some examples, these blockchain accounts may be similar except for the master blockchain account which may be configured to fund and create one or more assets. Creation and transfer processes of the assets are further illustrated in FIG. 5A and FIG. 5B. In some examples, the Media Company blockchain account, Merchant blockchain account, and Charity blockchain account may already have been added to the backend, which is configured to create an account for those entities on Steller blockchain and add a minimal balance of Stellar Lumens so as to cover processing fees and hold the account.

After a merchant determines what denominations of certificates they wish to sell, and have been affiliated with a media company such as by the backend, the master blockchain account may be configured to create one or more assets using a formula aBcDEfGhXX, where XX may represent the denomination and aBcDEfGh may represent a unique character string generated by the backend for those certificate assets, then transfers the total number of certificate assets to the affiliated media company blockchain account. Creation and transfer of assets are further described below.

For a consumer, a blockchain account may be created in the same or similar manner as Media Company and the Merchant but only when they purchase a certificate. Once the certificate has been purchased, which may be referred to as the primary certificate, it may be transferred from the Media Company blockchain account to the Consumer blockchain account, and a new certificate may be created to represent a value of the primary certificate. The new certificate may be referred to as a ghost certificate. In some examples, the ghost certificate may be created to represent 20% of the value of the primary certificate. The ghost certificate may comprise a code that matches with the primary certificate along with an appended trailing character, such as "c". For example, for a $20 certificate, the ghost certificate may include aBcDEfGh20c. Upon redemption of the certificate at the Merchant, the primary certificate may then ultimately be transferred from the Consumer blockchain account to the Merchant blockchain account. All, or a portion of, the above transfers may be viewed on Stellar blockchain.

Figure 3A:
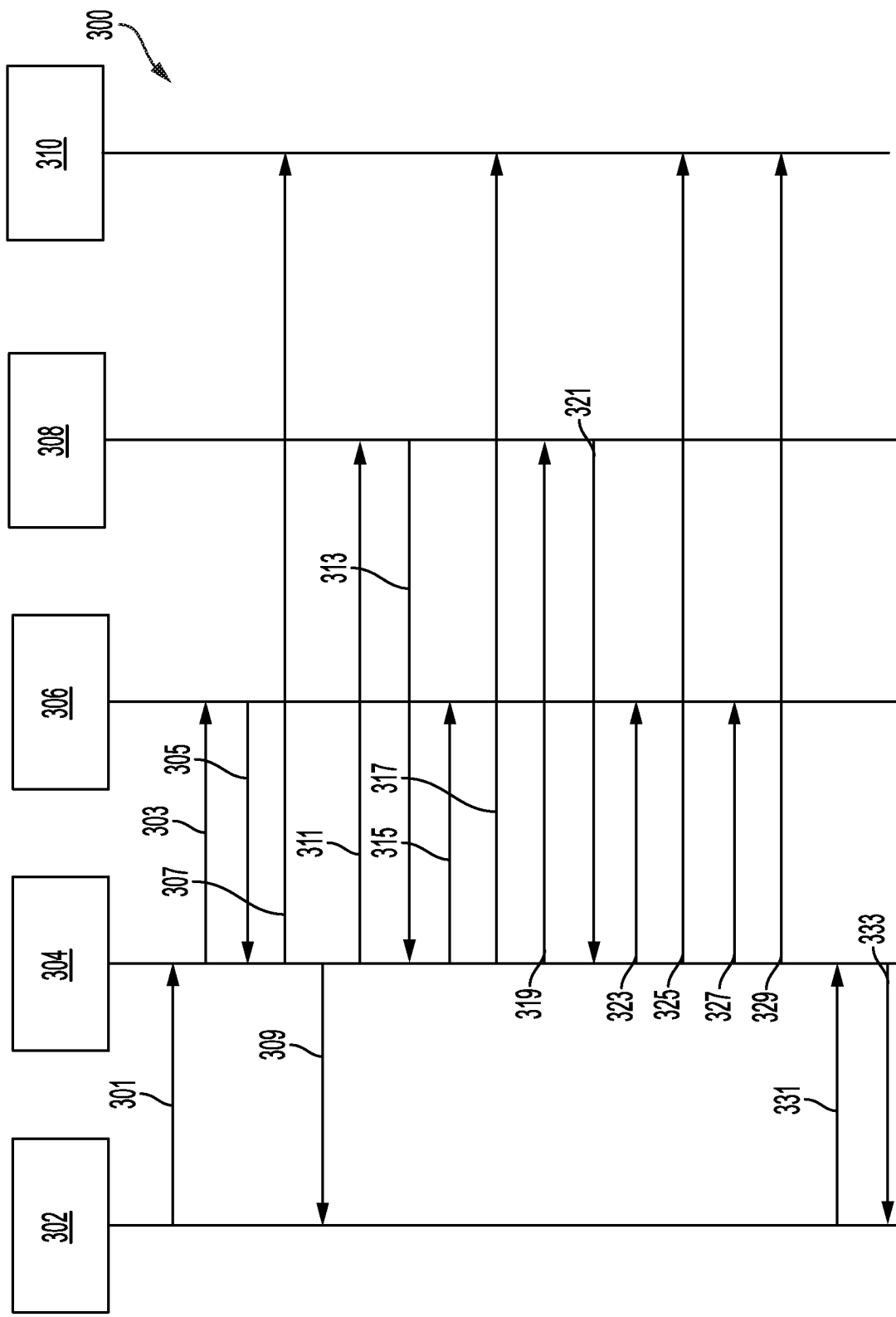
FIG. 3A and FIG. 3B and FIG. 3C illustrate timing diagrams for systems and processes according to an exemplary embodiment.

At block 240, a consumer may request to purchase one or more certificates from the merchant, and indicate that its proceeds be provided to a preferred charity. In some examples, the consumer may be associated with the first device, as explained above with respect to FIG. 1. In addition, the consumer may provide payment information to purchase the one or more certificates. The consumer may transmit this request to the one or more servers. In some examples, the systems and methods described herein may employ wireless and/or wired communications, including but not limited to near field communication (NFC) compatible digital wallets, direct entry, or magnetic stripe cards. For example, payment for the one or more certificates may be made by the first device of the consumer using one or more of these processes. In some examples, at least one of the one or more certificates that is purchased may be restricted to purchase through a web-browser process, instead of via the application. For example, regarding asynchronous purchase of the one or more certificates, the client device may be in communication with one or more servers, which may be in communication with one or more databases, blockchain, and a provider, as illustrated in FIG. 3A.

In some examples, asymmetric JSON web token (JWT) authentication may be performed to ensure that the application is secured between the client device and the one or more servers. For example, one or more public/private keys may be generated prior to authentication of the user, and a java key store file may be created to store the encrypted public/private keys. The public key may be extracted and saved as a text file. During the authentication process, one or more user credentials may be transmitted using one or more endpoints. One or more endpoints may return one or more tokens, such as the access and refresh token, to the client. In some examples, when a client device requests access to an endpoint and supplies valid credentials, they are returned a JWT access token and expire time (duration), a refresh token, an identifier for the JWT token, and other information, including user identification. The access token may comprise a shorter duration than the duration of the refresh token. For example, the shorter duration may comprise one day whereas the refresh token may comprise thirty days. When the access token is no longer valid and the refresh token is valid, the user may be allowed to receive a new access token and continue using the service. When the access token and the refresh token are both no longer valid, the user may be prompted to supply their login credentials. In some examples, the refresh token may be adjusted by the merchant so as to effectuate a change in the duration, such as thirty days, sixty days, ninety days, or another designated time. When a protected resource is accessed by the one or more endpoints, the public key may be validated by the one or more servers and the access token may be passed. If the verified public key matches the sign in public key, then a digital signature is successfully validated.

Figure 3B:
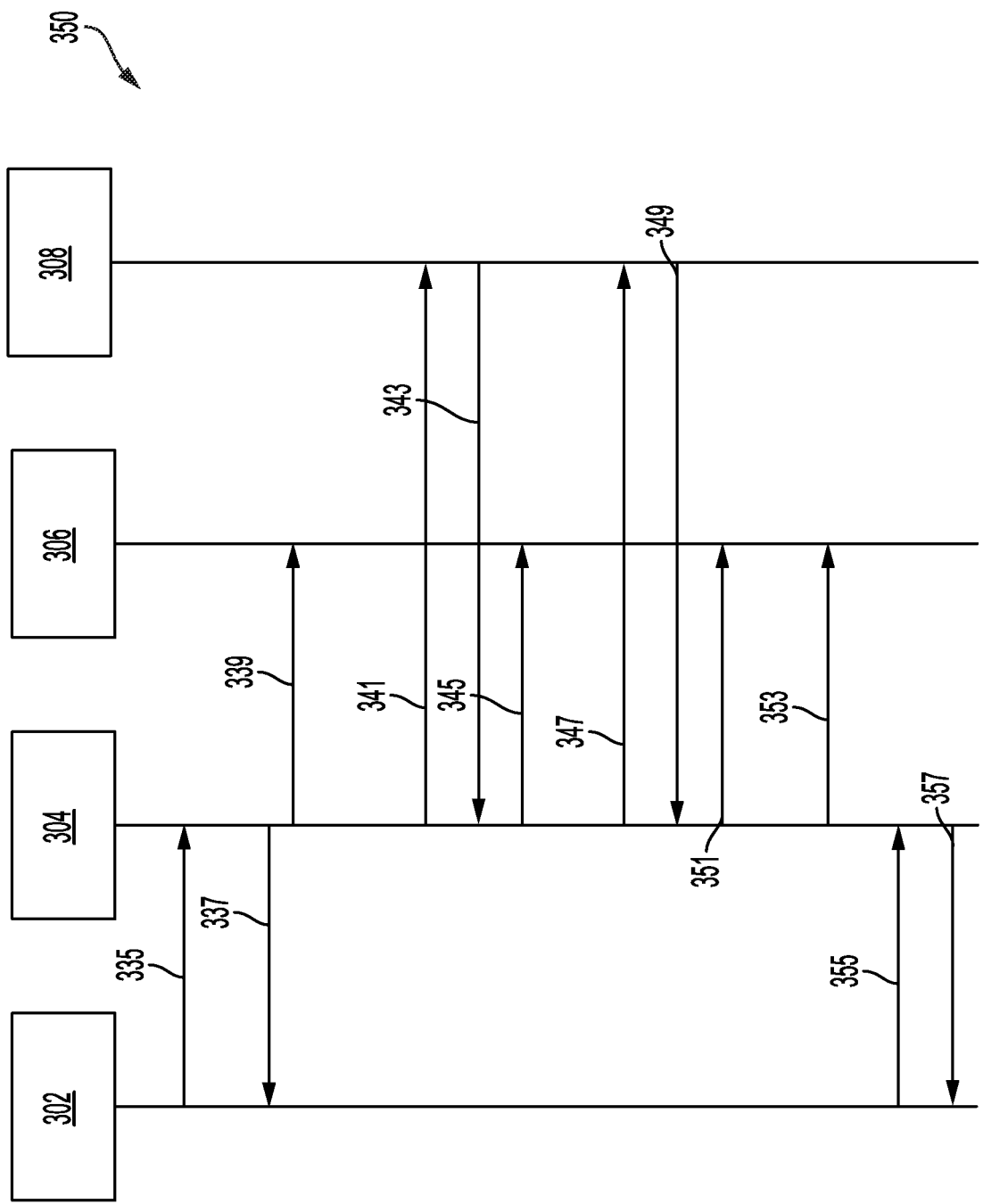

In some examples, the one or more certificates may be fully or partially redeemed. In some examples, only one certificate may be redeemed at a time by one or more servers and the blockchain. The one or more certificates may be purchased and redeemed in an asynchronous manner so that it is unnecessary for the consumer to remain on the page of the application for the duration of the one more servers and blockchain communication sequence. In some examples, this duration may be predetermined and may last up to one or more seconds, minutes, or hours. Additionally, the systems and methods described herein avoids the user and merchant having to press back and not receiving feedback about the state of the transaction. For example, regarding asynchronous redemption of the one or more certificates, a device may be in communication with one or more servers, which may be in communication with one or more databases, and blockchain, as illustrated in FIG. 3B.

The one or more certificates may include an expiration date. The one or more servers may be configured to control transmission of one or more reminders to the consumer at a predetermined time prior to the expiration date. In some examples, the one or more reminders may be transmitted to the consumer device three days prior to the expiration date of the one or more certificates. In other examples, the one or more reminders may additionally or alternatively be transmitted to the consumer on the day of the expiration date of the one or more certificates.

Regarding the purchasing of the one or more certificates, the consumer may purchase a certificate via their device. The consumer may confirm purchase of the certificate. A temporary certificate may be inserted into one or more databases with a pending state that may be displayed in the certificate card. While in this pending state, the consumer may not redeem the certificate. In some examples, the certificate may be created in the database. The blockchain may be configured to confirm its creation, and until then, it is a temporary certificate and listed as pending. The consumer may not redeem the certificate until it is processed on the blockchain and then causes the certificate to become active. To the extent there is a failure, the certificate may be deleted on the backend. The one or more servers may execute the purchase request. If the response is successful, the temporary certificate may be removed and replaced with the one received from the one or more servers such that the status of the certificate on the first device may change from a first status to a second status, such as changed to active and ready for redemption. If the certificate transaction was unsuccessful, the temporary certificate may be removed. If the connection drops or there is a timeout, the client may periodically try or check if the certificate was actually purchased. The one or more servers may create a notification that informs the consumer that the certificate is ready for redemption (if the purchase was successful), or that informs the consumer that there was a problem and that the certificate was not purchased.

In some examples, with respect to the purchase of the certificate via a device, one or more requests may be transmitted to a server, such as a JAVA server. The server may be configured to generate a random 16 digit code. Then, an entry may be created on the blockchain before it receives an approval from an issuer, such as a credit card company. To the extent that this transaction finished before a timeout, the transaction hash is associated with the code and it may be sent to provider for acceptance and payment processing, including but not limited to Braintree. If it is not accepted by the provider, it is deleted from a giftcard table or its status may be updated to show a purchase error in the giftcard table. Accordingly, a refund process is triggered in which the certificate moves from the user account back to the media company account. To the extent that the transaction did not finish before the timeout, a row is deleted from the giftcard table.

In some examples, the consumer may select, via the user interface of its device executing the application, a button to confirm purchase of the one or more certificates. As a consequence, the consumer may be redirected to the purchase successful/pending screen on a display of its device. The one or more certificates may then be immediately visible in the one or more certificates list, as well as its reflected state in the certificate. The one or more certificates may be redeemable after it has been successfully purchased via an authorized payment. The certificate card may be added to the certificate list, with the pending state displayed. After the backend responds, one or more of the following actions may take place: if successful, one or more states (such as the pending state) may be removed and the one or more certificates are displayed like normally; if an error occurred, the pending state is replaced with the error state; if a timeout occurred, the mobile client may be configured to monitor the one or more certificates in the normal sync procedure.

The one or more states may be associated with the state of the transaction, and may include a pending state, a redeemable state, a failed state, or an error state. Each of these states are described herein. With respect to the pending state, the client and one or more servers are aware of the state. The mobile client may insert a temporary certificate and set it to pending. The one or more servers may create the certificate when the request is received and set it to pending. With respect to the redeemable state, the client and the one or more servers are aware of the state. The mobile client may only set the redeemable state if the purchase request is successful or the sync returns it as such. The one or more servers may set the redeemable state if one or more of the following occur: the request to the blockchain executed successfully and is able to respond to the mobile client; a sync requested it, it is fetched correctly (it is not desynchronized), and it was previously in the pending state. With respect to the failed stated, the client is aware of the state but not the one or more servers. The mobile client may set the failed state if the purchase request result in an error, the error not due to a timeout. The one or more servers created the pending certificate, executed the normal flow, but an error occurred. For example, the error may be attributed to a refusal by the blockchain. The one or more servers then deletes the certificate and returns the corresponding error code. With respect to the error state, the client and one or more servers are aware of the state. The mobile client may set the error state if the one or more servers reported it with this state during sync. The one or more servers will set the error state if the certificate is desynchronized (instead of not returning it) and return it as normally during sync.

Figure 4:
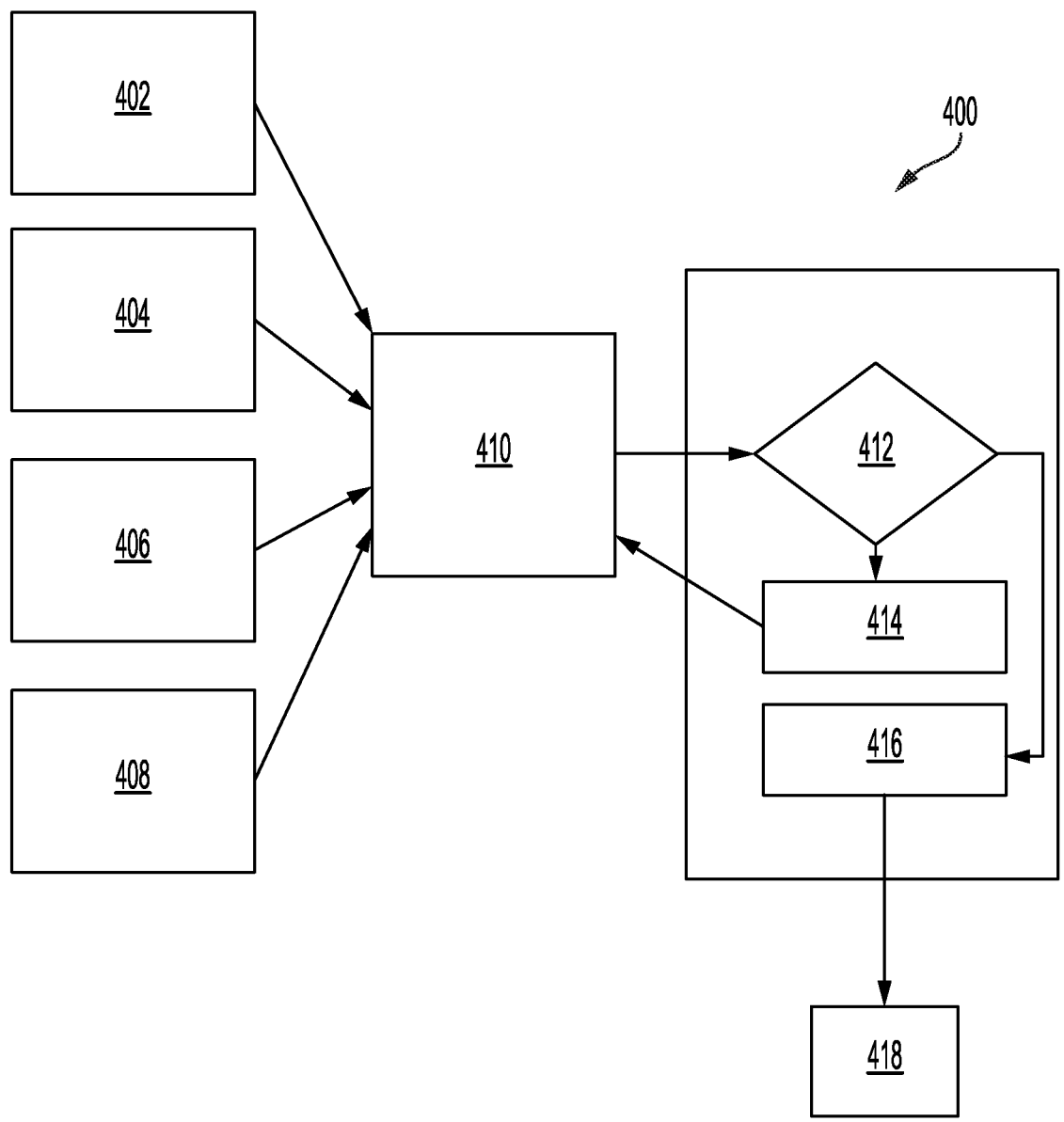
FIG. 4 illustrates a system according to an exemplary embodiment.

In some examples, the one or more servers may receive one or more of the following parameters: merchant blockchain identifier, consumer blockchain identifier, purchase amount, and a security password or passphrase. By way of example, one or more of the parameters, such as the security password and merchant blockchain identifier, may be provisioned in a point-of-sale device (POS). As further discussed below, FIG. 4 illustrates an example of the interaction between the backend and POS device. In some examples, the password may be associated with a merchant account identifier. The one or more servers may check an account, such as a consumer account, for any existing certificates from the specified merchant, and the one or more servers may return one or more messages to the consumer. In some examples, the one or more messages may comprise a message indicative of a success message that the purchase is paid in total or that the purchase is partially paid with the amount remaining due. Alternatively, the one or more messages may comprise a message indicative of an error message with explanation, for example, whether the purchase is not paid or if there was an error in purchase.

In some examples, the consumer may be prompted to install a mobile application on their device. In some examples, the consumer may be prompted to create an account after installing and executing the mobile application. The consumer may provide profile details as part of their account creation. After creating an account, the consumer may receive a notification, such as a user interface notification, on their device. The notification may require that the user check their email prior to attempting to purchase one or more certificates. In some examples, the consumer may update profile details, including an associated email address. In some examples, the consumer may log in via one or more social media options, including but not limited to Facebook®, Twitter®, or Google® accounts. After login verification by the one or more servers, the consumer may browse for one or more merchants. In some examples, the consumer may view a merchant's one or more certificates, as well as merchant details. In some examples, the consumer's merchant list may be limited by geographical area. For example, the consumer may browse merchants so as to filter on state and/or city information. In some examples, the consumer may view one or more certificates that have been purchased. The consumer may then choose a preferred charity for designating donation. In some examples, the consumer may change the preferred charity. In some examples, the selection of the charity may include a specified geographic region. The consumer may be prompted to view additional information regarding the charity, including but not limited to: phone, website, one or more videos, one or more images, address, logo, and description. The consumer may provide credit or debit card information when purchasing one or more certificates. The consumer may purchase one or more certificates from a merchant with valid credit or debit card information. In some examples, the consumer may redeem, a whole or in part, one or more certificates at an issuing merchant. The user may receive a message when purchasing one or more certificates that funds are provided to their preferred charity at the time of purchase, not at the time of redemption. In other examples, the funds may be paid to a charity at the time of redemption. As such, the charity account may be closed or set as deleted and removed. In some examples, the consumer may purchase one or more certificates from a merchant all at once, but may limit the redemption to a predetermined rate. In some examples, the predetermined rate may be mutually agreed upon with the merchant.

In some examples, after purchase of one or more certificates and a charity is supported through this donation, one or more social media posts may be correspondingly generated by the one or more servers. Accordingly, the one or more social media options may be in data communication with the one or more servers for logging into the application as well as linking the one or more social media posts. For example, the one or more social media posts may comprise a Facebook® post indicative of an amount donated and/or the preferred charity for the account associated with the consumer. As a consequence, this process may enable a constant comment stream of status updates regarding what activity is taking place at a charity and who is supporting it. In some examples, the one or more social media posts must be approved by the consumer prior to its posting.

In some examples, the consumer may arrive at a register, such as the merchant's register, and the POS device with an amount of goods or services to be purchased by their device. The merchant may enter the amount in their register and activate the POS device for the payment amount by the consumer. The consumer may scan their consumer certificate identifier at participating merchants. The POS device may track information so as to enable accounting and auditing of register transactions from the consumer device. When prompted for a membership card or credit card or debit card payment for the purchase amount, the POS device may receive the consumer certificate account identifier through NFC, magnetic stripe card, or direct entry. The POS device may then communicate with the one or more servers and transmit the purchase amount, consumer account identifier, merchant identifier, and password. The one or more servers may return a success message with remaining amount due, for example, greater than or equal to $0.00, or an error code with a descriptive message. For example, the descriptive message may include at least one or more of: Consumer/Merchant identifier not found; merchant password incorrect; no consumer certificates present.

In some examples, one or more merchants may be invited, for example by the one or more servers, to create an account with the mobile application. For example, the merchant may provide profile details as part of their account creation. In some examples, the merchant may update their profile details. The merchant may, via the mobile application, redeem one or more certificates. In some examples, the merchant may add a parent company as part of an affiliation status. In some examples, the merchant may download one or more reports on their issued, unsold, and/or redeemed certificates, or any combination thereof, which may be generated by the one or more servers. The merchant account that redeems the one or more certificates may be reflected in the one or more reports. In some examples, the one or more merchants may be receive a notification, such as an email, from the one or more servers for each occurrence one or more certificates are purchased.

In some examples, the one or more servers may be configured to provide a report regarding one or more entities, including but not limited to consumers, media companies, and merchants, or any combination thereof. The one or more servers may be configured to view total charity accounts and total consumer accounts, total media company accounts, total merchant accounts, or any combination thereof. In some examples, the one or more servers may be configured to generate one or more invitations to one or more merchants, and further, determine whether the invited merchants are designated as pending or active invites that were provided to the one or more merchants. The one or more servers may invite one or more charities and/or media companies to register and create an account.

In some examples, the one or more servers may be configured to automatically generate a message containing updated redemption information of the one or more certificates when the updated redemption information has been stored in the one or more databases. For example, the message may be transmitted to the first device and the second device so as to provide access to the updated redemption information.

In some examples, the one or more media companies may create contracts to release groups of one or more certificates on a predetermined schedule or periodic basis. The media company may add and/or designate merchant and/or charity administrators, and may invite merchant and/or charity administrators.

At block 250, responsive to the request from the consumer, the one or more servers may issue one or more certificates, and be configured to save to the blockchain and move the one or more certificates from a first account to a second account, such as a wallet associated with the media company to a wallet associated with the consumer.

At block 260, responsive to the request from the one or more servers, the media company may provide the requested one or more certificates to the consumer, and the media company may also indicate that the consumer redeem the one or more certificates at the merchant. In some examples, this transaction may comprise a blockchain transaction.

At block 270, the consumer, responsive to the receipt of the one or more certificates from the media company, may present the one or more received certificates from the media company to the merchant for redemption. In some examples, this transaction may comprise a blockchain transaction.

At block 280, the merchant may then redeem the one or more certificates presented by the consumer. In some examples, redemption may occur through an image, data entry, wireless, or wired communication, or any combination thereof. The merchant may be in communication with the one or more servers. The one or more servers and/or the blockchain may be configured to prohibit repeat redemption of the one or more certificates. Regarding the redemption of the one or more certificates, the merchant may scan the certificate and enter the total value of the receipt. The redemption confirmation may be displayed on the consumer and/or merchant device illustrating the value that will be redeemed, including partial and total amounts. With respect to partial redemption, when a participating merchant redeems a consumer's certificate, the merchant may be prompted to enter a value for the certificate up to the total face value. In some examples, the total value being spent may be captured. When a partial value is entered, the value is transmitted to the backend, which is configured to validate the amount, process the redemption, and update the remaining value of the certificate in the database, as well as record the transaction on the blockchain. The merchant may select the approve button if a redemption of the certificate is possible. The merchant may then be notified that the redemption is pending, such as on a loading screen. The one or more servers may execute a redemption request. Selecting another button, such as the back button, has no significance as the redemption process is separately handled. If the merchant did not leave the screen, then one or more actions may take place: should the response be successful, the redemption successful screen may be displayed; should the response be unsuccessful, the redemption failed screen may be displayed. If the merchant left the screen, a foreground notification (that may not be dismissed) may be displayed that shows the redemption process taking place. If the response is successful or unsuccessful, the notification may be updated to reflect the corresponding state.

In some examples, the second device may be configured to exchange one or more codes to designate the one or more certificates as used on the first device. As explained above, the 16 digit numeric code may be created on the backend when the certificate is created. The code may be exchanged via one or more processes, as described herein. The merchant device may capture the number, and in some examples via a camera on the merchant device, to capture the QR code or a scanner to capture the barcode or manual entry. The number may then be communicated to the backend for one or more verification processes against the blockchain. In some examples, the second device may be configured to redeem the one or more certificates, including but not limited to an image, data entry, wireless, or wired communication, or any combination thereof, such as a captured QR code or coupon number.

In the exemplary embodiment of FIG. 3A, a system 300 is shown for purchasing one or more certificates as part of a timing diagram. In some examples, system 300 may include a device which comprises application 302, one or more servers or backend 304, one or more databases 306, blockchain 308, and provider 310. Although FIG. 3A illustrates single instances of the components, system 300 may include any number of components. FIG. 3A may reference same or similar components, such as device, application, servers or backend, databases, blockchain, as previously described above. For example, the charity may be assigned or chosen by the consumer via the device executing the application.

At block 301, application 302 executing on device may purchase one or more certificates. In some examples, the device may transmit a request to the backend 304 to create one or more certificates. Responsive to the request from application 302, the backend 304 may be configured to create one or more certificates with database 306 at block 303. At block 305, database 306 may be configured to return the one or more certificates to the backend 304. After the one or more certificates have been returned to the backend 304, the backend 304 may be configured to create an unsettled transaction at block 307. Since the transaction has not yet been settled, provider 310 awaits activity regarding the transaction settlement. In some examples, provider 310 may comprise a payment provider such as Braintree. At block 309, application 302 may be configured to display a pending status or purchase error regarding the certificate. At block 311, the backend may be configured to transmit a request to buy from blockchain 308. At block 313, blockchain 308 may be configured to return a success or timeout notification to backend 304. For example, should a success notification be determined by the blockchain 308 regarding transaction approval at block 313, backend 304 may be configured to update a corresponding status to OK in database 306 at block 315. Based on this success notification, backend 304 may be configured to settle the transaction with provider 310 at block 317. For example, should a timeout notification be determined by blockchain 308 at block 313, backend 304 may be configured to initiate polling for a predetermined period of time at block 319. In some example, the predetermined period of time may comprise a designated time of seconds, minutes, hours, days, weeks, months, etc. At block 321, blockchain 308 may be configured to return a success or error notification to backend 304. For example, should a success notification be determined, backend 304 may be configured to update a corresponding status to OK in database 306 at block 323. Based on this success notification, backend 304 may be configured to settle the transaction with provider 310 at block 325. For example, should an error notification be determined, backend 304 may be configured to update a corresponding status to ERROR_BUY at block 327. Based on this error notification, backend 304 may be configured to refund the transaction with provider 310 at block 329. At block 331, mobile application 302 may be configured to sync with backend 304, so as to receive an OK or purchase error message at block 333. Further, if a buy operation is interrupted by an unexpected shutdown of an instance, it may be resumed when the application 302 itself starts.

In the exemplary embodiment of FIG. 3B, a system 350 is shown for redeeming one or more certificates as part of a timing diagram. In some examples, system 350 may include a device which comprises application 302, one or more servers or backend 304, one or more databases 306, and blockchain 308. Although FIG. 3B illustrates single instances of the components, system 350 may include any number of components. FIG. 3B may reference same or similar components, such as device, application, servers or backend, databases, blockchain, as previously described above. In some examples, application 302 may execute on a same or different device than that of application executing on device in FIG. 3A.

In some examples, to redeem the certificate, the client device may be configured to present the certificate to the merchant device, such as via an image, data entry, wireless, or wired communication, or any combination thereof, including but not limited to scan QR code, NFC, or entered input or data entry of member card, such that the merchant device confirms the existence of the certificate. Thereafter, as explained below, asynchronous confirmation of redemption of the certificate may take place on the blockchain. In other examples, the client device may be configured to redeem their own certificate to the extent that the merchant device is unable to do so due to one or more exigent or emergency circumstances, such as an issue with the merchant. As a consequence, the backend 304 may be configured to transmit one or more notifications to the merchant indicating the self-redemption by application 302 executing on the device, and thus the merchant may be dealt with afterwards.

In some examples, when a user encounters an issue with redemption of the one or more certificates, such as an error associated with the system or merchant or scanning device, the first device may comprise a user interface to discourage use until necessary, such as the error. For example, a troubleshooting process may be configured to be displayed on the user interface which may include a capture of an image of a receipt of a merchant.

At block 335, application 302 executing on device may redeem one or more certificates. In some examples, application 302 may comprise the same application executing on a client device and merchant device. In some examples, the merchant application may act independent of the application of the client device by entering a number later when system 300 resumes to operating despite the merchant not being present. In some examples, the application executing on the client device may communicate with system 300 to initiate redemption, including but not limited to self-redemption. In some examples, the device may transmit a request to the backend 304 or provide a unique code. At block 337, backend 304 may be configured to transmit a response to application 302 indicative of OK or unique code. Responsive to the request from application 302, the backend 304 may be configured to create one or more redeem transactions with database 306 and update the remaining value at block 339. Database 306 may be configured to include a complete mirror of the present state of blockchain 308, or store sufficient information to validate the one or more certificates. At block 341, backend 304 may be configured to redeem the transaction with blockchain 308. At block 343, blockchain 308 may be configured to return a success or timeout notification to backend 304. For example, should a success notification be determined by the blockchain 308 regarding redemption at block 341, backend 304 may be configured to update a corresponding status to OK in database 306 at block 345. For example, should a timeout notification be determined by blockchain 308 at block 341, backend 304 may be configured to initiate polling for a predetermined period of time at block 347. In some example, the predetermined period of time may comprise a designated time of seconds, minutes, hours, days, weeks, months, etc. At block 349, blockchain 308 may be configured to return a success or error notification to backend 304. For example, should a success notification be determined, backend 304 may be configured to update a corresponding status to OK in database 306 at block 351. For example, should an error notification be determined, backend 304 may be configured to update a corresponding status to REDEEM_ERROR and transmit a related message, such as via email, to an administrator at block 353. At block 355, mobile application 302 may be configured to sync with backend 304, so as to receive an OK message at block 357. Further, if a redeem operation is interrupted by an unexpected shutdown of an instance, it may be resumed when the application 302 itself starts. When the transaction is completed on the blockchain 308, the OK message may indicate that the certificate has moved to a redeemed status.

In some examples, backend 304 and database 306 may be configured as a single component (in other examples, they may be separate components) to perform one or more processes disclosed herein. By way of example, backend 304 may comprise logic configured to check database 306 or data object that represents existing certificates for lookup and validation.

As a consequence of the asynchronous purchase and redemption processes, as illustrated above, the systems and methods disclosed herein avoids the situation where a user must wait for any part of the purchase and/or redemption process, thereby improving the overall experience. The backend 304 may be configured to perform one or more conditional checks for both asynchronous purchase and redemption, as described above, and determine whether a blockchain operation is coming through successfully for a given certificate, which it may then appropriately mark that item. In some examples, the creation of the unsettled transaction may trigger the asynchronous process. As part of the asynchronous purchase process, such as a first asynchronous process, numerous levels or states of connectivity may be required, such as the backend 304 may be configured to connect and interact with the database 306, blockchain 308, and confirmation from provider 310, as explained above with respect to FIG. 3A. As part of the asynchronous redemption process, such as a second asynchronous process, numerous levels or states of connectivity may be required, such as the backend 304 may be configured to connect and interact with the database 306, blockchain 308, as explained above with respect to FIG. 3B.

In some examples, similar to the problems faced with the purchase process, as explained above, the asynchronous redemption process may rectify these problems, for example, where the blockchain 308 was queuing one or more transactions that may have timed out for the mobile application 302 and backend 304 but went through on the blockchain 308. In some examples, the asynchronous process may be used for transfer of certificates to another consumer. For example, because one or more transactions were completed synchronously, they all needed to be completed within a certain amount of time, which caused discrepancies between the blockchain 308 and backend 304. By a second asynchronous process as described above with respect to FIG. 3B, these discrepancies are resolved. A call may be made out to the blockchain 308, and it may be marked as pending in the mobile application 302. Based on various states, the backend 304 may be updated. The backend 304 may be configured to uniquely identify the transaction itself based on the unique code.

Figure 3C:
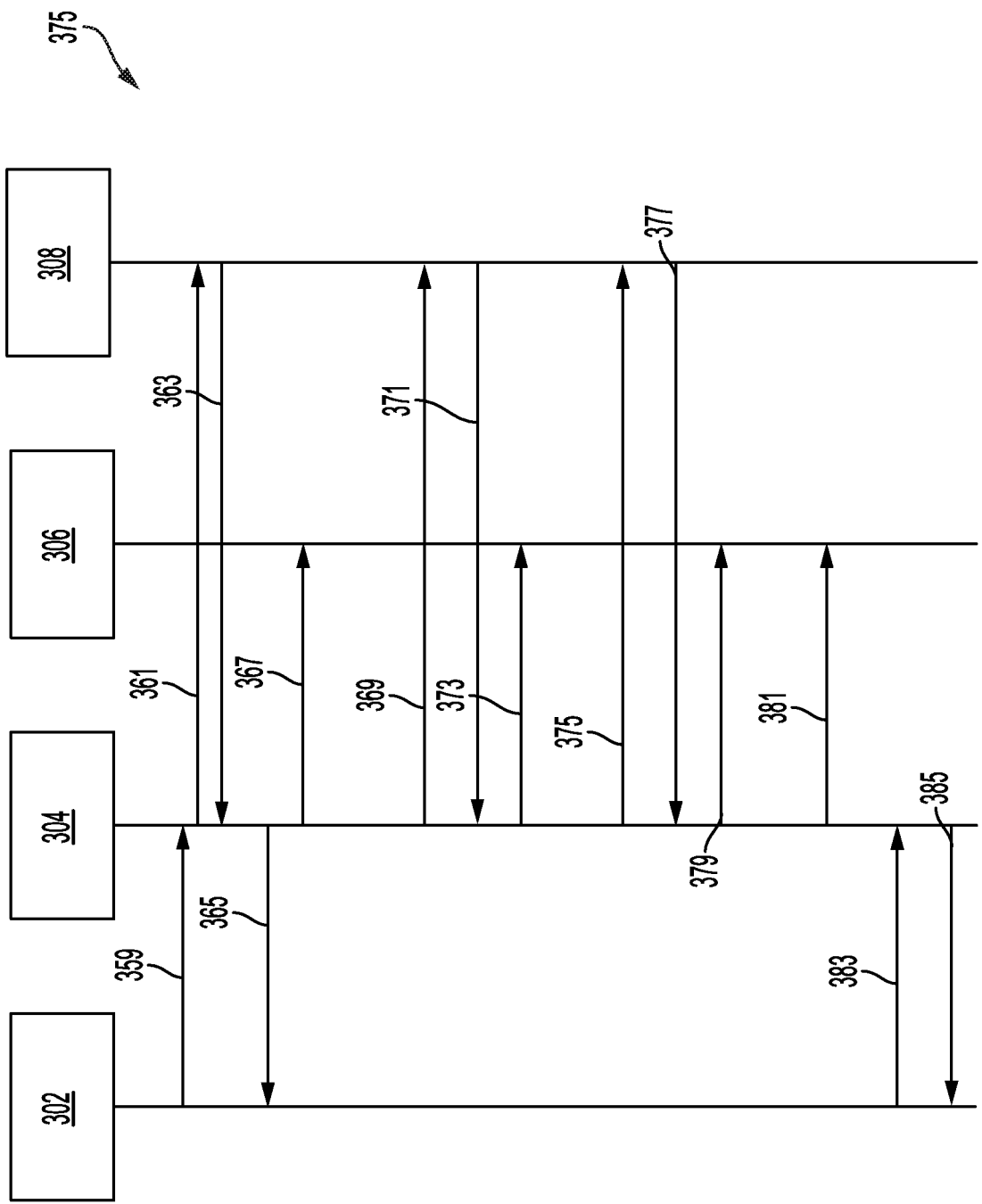

In the exemplary embodiment of FIG. 3C, a system 375 is shown for redeeming one or more certificates as part of a timing diagram. Although FIG. 3C illustrates single instances of the components, system 370 may include any number of components. FIG. 3C may reference same or similar components, such as device, application, servers or backend, databases, blockchain, as previously described above.

At block 359, application 302 executing on device may redeem one or more certificates. In some examples, application 302 may comprise the same application executing on a client device and merchant device. In some examples, the merchant application may act independent of the application of the client device by entering a number later when system 300 resumes to operating despite the merchant not being present. In some examples, the application executing on the client device may communicate with system 300 to initiate redemption, including but not limited to self-redemption. In some examples, the device may transmit a request to the backend 304 or provide a unique code. Backend 304 may be configured to poll blockchain 308 to confirm that the one or more certificates is valid. For example, at block 361, backend 304 may transmit one or more requests to blockchain 308 for validation of the one or more certificates. Responsive to the one or more received requests from backend 304 at block 361, blockchain 308 may be configured to retrieve data to confirm or otherwise indicate that the one or more certificates are valid, and transmits one or more messages thereof to the backend 304 at block 363. At block 365, backend 304 may be configured to transmit a response to application 302 indicative of OK or unique code. Responsive to the request from application 302, the backend 304 may be configured to create one or more redeem transactions with database 306 and update the remaining value at block 367. Database 306 may be configured to include a complete mirror of the present state of blockchain 308, or store sufficient information to validate the one or more certificates. At block 369, backend 304 may be configured to redeem the transaction with blockchain 308. At block 371, blockchain 308 may be configured to return a success or timeout notification to backend 304. For example, should a success notification be determined by the blockchain 308 regarding redemption at block 369, backend 304 may be configured to update a corresponding status to OK in database 306 at block 373. For example, should a timeout notification be determined by blockchain 308 at block 369, backend 304 may be configured to initiate polling for a predetermined period of time at block 375. In some example, the predetermined period of time may comprise a designated time of seconds, minutes, hours, days, weeks, months, etc. At block 377, blockchain 308 may be configured to return a success or error notification to backend 304.

For example, should a success notification be determined, backend 304 may be configured to update a corresponding status to OK in database 306 at block 379. For example, should an error notification be determined, backend 304 may be configured to update a corresponding status to REDEEM_ERROR and transmit a related message, such as via email, to an administrator at block 381. At block 383, mobile application 302 may be configured to sync with backend 304, so as to receive an OK message at block 385. Further, if a redeem operation is interrupted by an unexpected shutdown of an instance, it may be resumed when the application 302 itself starts. When the transaction is completed on the blockchain 308, the OK message may indicate that the certificate has moved to a redeemed status.

Accordingly, and by way of example, there may all, some, or no data from blockchain mirrored in the database to determine existence of the one or more certificates prior to redemption of the one or more certificates. In one example, all data in blockchain 308 may be mirrored in database 306. In another example, a portion of the data in blockchain 308 may be mirrored in database 306. In another example, none of the data in blockchain 308 is mirrored in database 306. As mentioned above, obtaining data from the blockchain 308 is available but it may take processing time. Thus, by performing one more synchronous processes for one or more transactions, including but not limited to redemption of the one or more certificates, there is the ability to add another block.

FIG. 4 illustrates a system 400 configured to process redemption of one or more certificates. In some examples, system 400 may comprise a device 410, such as point of sale device, in communication with one or more servers 412, such as a backend. Device 410 may be configured to receive one or more inputs. In some examples, POS device 410 may be authenticated as the merchant. One or more inputs 402, 404, 406, 408 may be transmitted to the POS device 410, including but not limited to NFC transmission via a mobile device 402; manual entry of an account identifier 404; magnetic card swipe 406; or a purchase amount from the register 408. In some examples, device 410 may be configured to transmit one or more of merchant blockchain identifier, consumer blockchain identifier, and purchase amount to the backend 412. The backend 412 may be configured to receive one or more of merchant blockchain identifier, consumer blockchain identifier, and purchase amount from device 410 to determine whether the consumer has certificates with balance for the merchant blockchain identifier. To the extent the backend 412 determines a sufficient balance, an asset code may be returned 416, in which the redemption process may proceed 418, as described with respect to FIG. 3B. To the extent the backend 412 determines an insufficient balance, a return of "No Funds" message may be transmitted 414 from the backend 412 to the POS device 410. Responsive to the determination of the insufficient balance by backend 412, POS device 410 may be configured to display the "No Funds" message.

In other examples, one or more databases and backends may be utilized to write contents of the blockchain thereto, which may then be checked against. For example, checking back to the one or more databases may be reflective of the present state of the blockchain regarding the one or more transactions associated with the one or more certificates and/or one or more transactions.

Figure 5A:
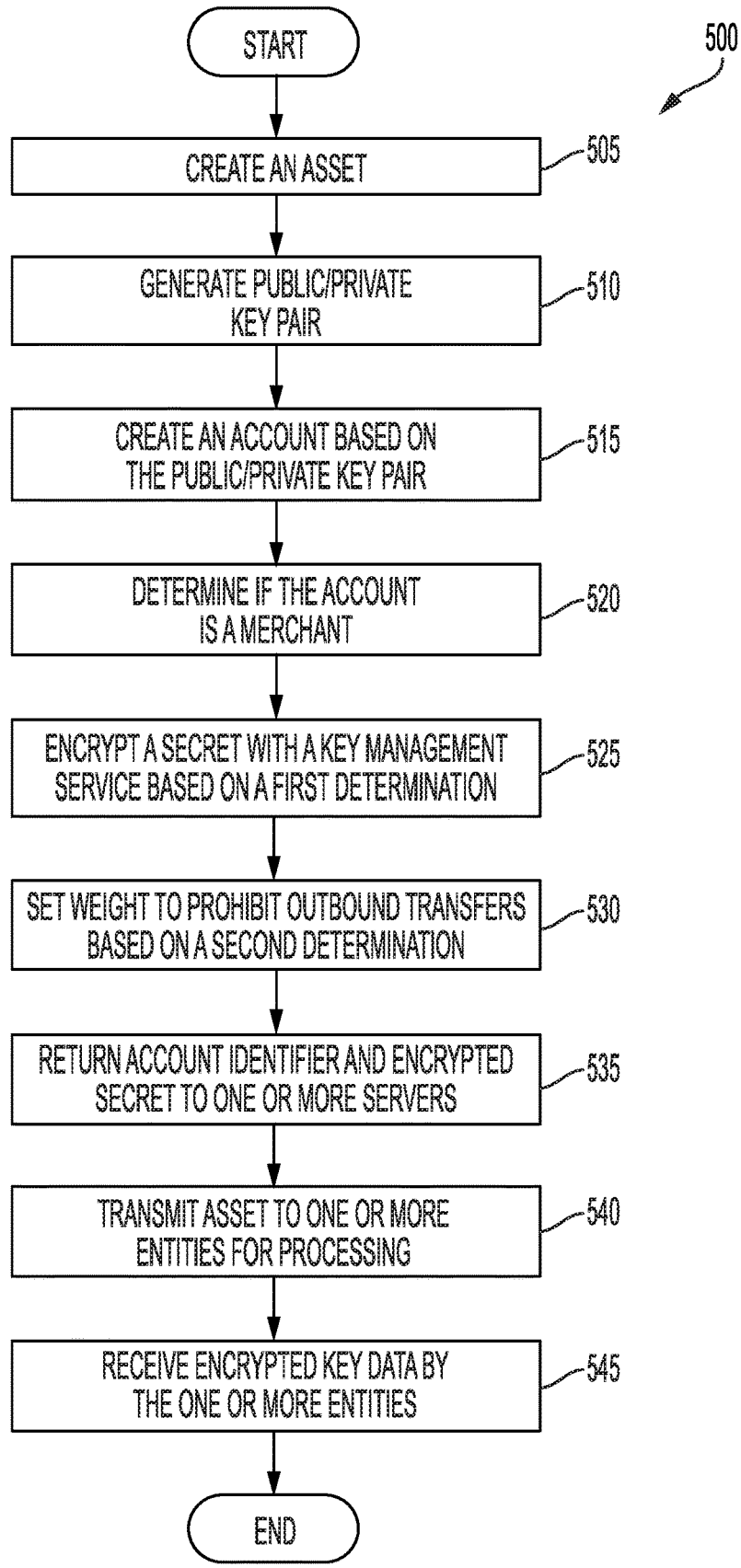
FIG. 5A and FIG. 5B illustrate processes for creating and transferring assets according to an exemplary embodiment.
Figure 5B:
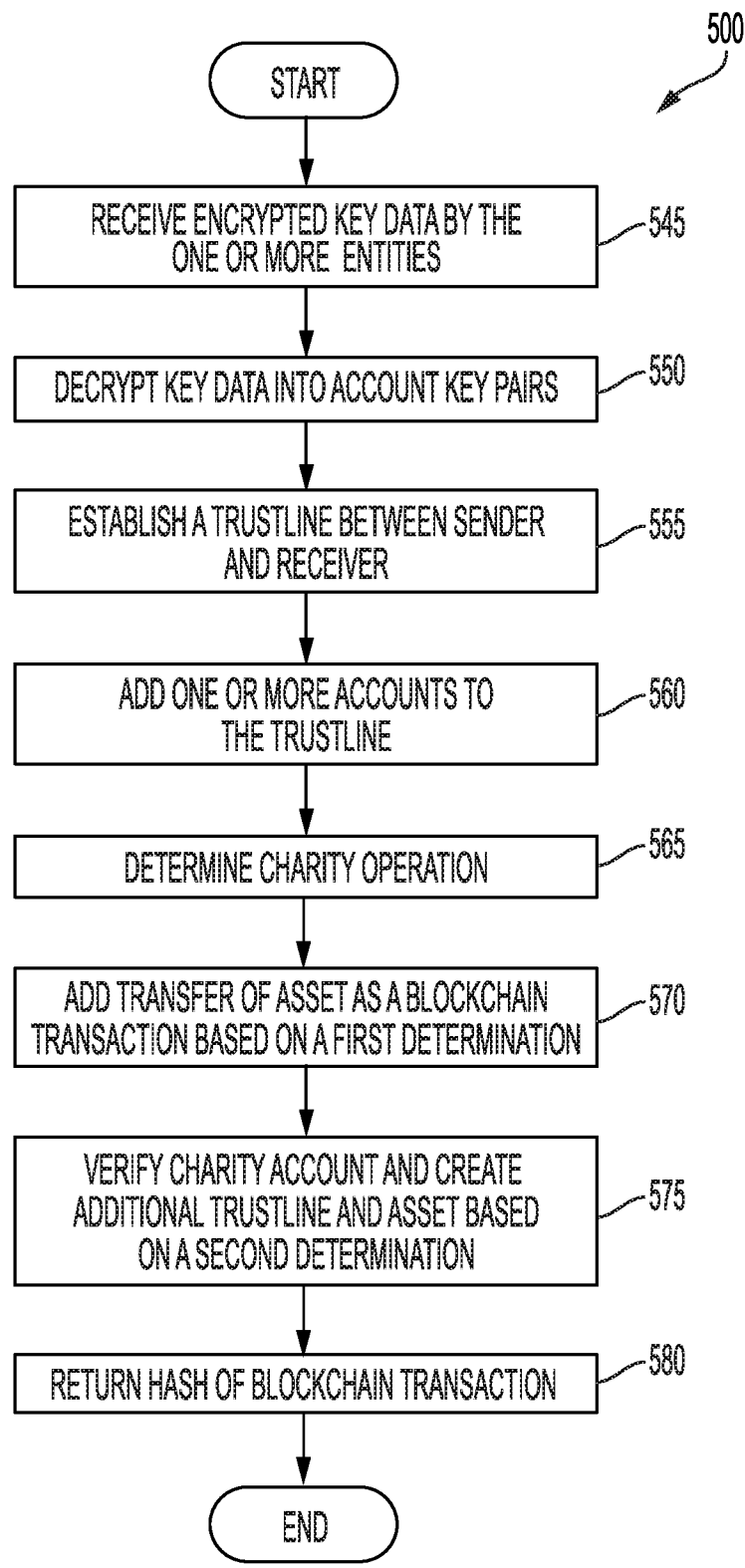

FIGS. 5A and 5B illustrate a process for creation and transfer of an asset. Transfer of the asset certificate may occur from one wallet account to a second wallet account. In some examples, this may include from the exchange wallet account to the media company wallet account, from the media company wallet account to the consumer wallet account, from the consumer wallet account to another consumer wallet account, from the consumer wallet account to the merchant account via one or more trustlines. In some examples, As depicted in FIG. 5A, method 500 for creating an asset may include creating an account at block 505. For example, a blockchain account may be created. After creation of the account, the method may include generating a random public/private key pair at block 510. The generation of the random public/private key pair does not require feedback from the blockchain. The method may include creating and funding the new account at block 515, from block 505, using the public/private key pair of block 510. In some examples, one or more key pairs may be generated to create one or more accounts. The method may include determining if the account is a merchant account at block 520. To the extent that the account is determined not to be a merchant account, the method may include encrypting a secret with a key management service, such as Google KMS® at block 525. To the extent that the account is determined to be a merchant account, the method may include setting weight to prohibit outbound transfers at block 530, and then proceeding to block 525. After encryption in block 525, the method may include returning an account identifier and encrypted secret to one or more servers or backend at block 535. In some examples, these may be retrieved and then decrypted on the blockchain side to use the account. As explained below, every time a certificate is moved, a trustline is created for that certificate. For example, the recipient of the certificate and the sender, such as the entity offering the certificate, must have a trustline established between these two accounts. In some examples, the trustline may be used to transfer one or more certificates but not a cryptocurrency, which may be used to fund transaction costs, such as a lumen.

As depicted in FIG. 5B, method 500 may continue to transfer the asset and resume from block 535 in FIG. 5A. The method may include transferring the blockchain asset at block 540. At block 545, the method may include receiving encrypted keydata for one or more entities, including for sender and receiver. At block 550, the method may include decrypting keydata into account keypairs. At block 555, the method may include establishing a trustline between the sender and receiver. At block 560, the method may include adding one or more accounts to the trustline. At block 565, the method may include determining if a charity operation is needed. To the extent it is determined that no charity operation is needed, the method may include adding transfer of the asset as a blockchain transaction at block 570. To the extent it is determined that a charity operation is needed, the method may include verifying a charity account, and creating an additional trustline and asset at block 575, and then proceeding to block 570. At block 580, the method may include returning a hash of the blockchain transaction of block 570.

Figure 6:
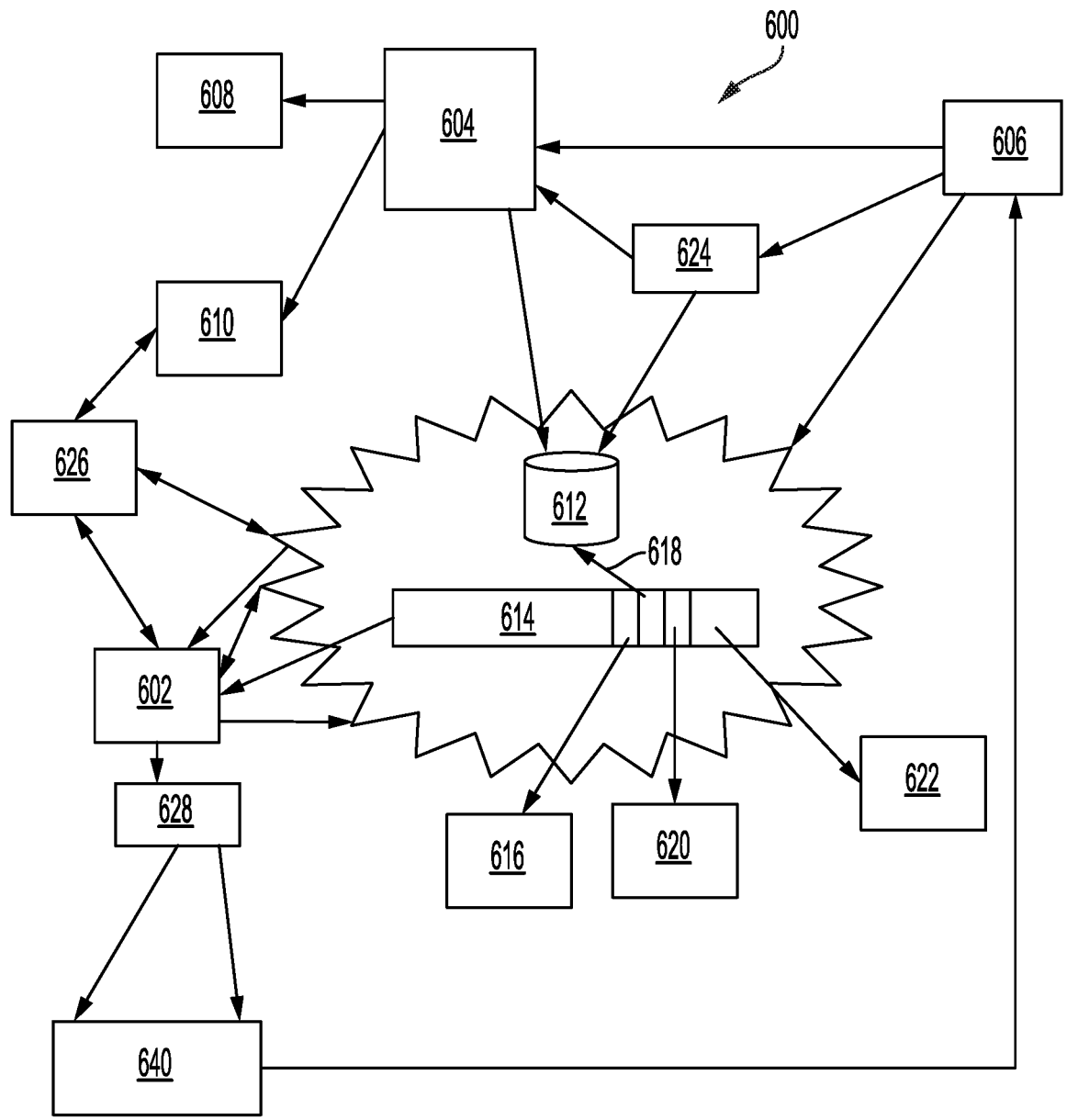
FIG. 6 illustrates a diagram of an e-certificate system according to an exemplary embodiment.

In the exemplary embodiment of FIG. 6, a system 600 is shown for processing one or more e-certificates through a company, such as a media company 602, in exchange for advertising. At the point of purchase 604, the e-certificates may be exchanged, for example between one or more consumers 606 and one or more charities 608, for goods and/or services utilizing, by way of example, at least one or more of near field communication (NFC), QR, bar code, manual, and debit or credit card data transfer. In some examples, cloud-based database 612 may be configured to validate the certificate. Consumer 606 may be configured to purchase one or more certificates via one or more devices.

In some examples, one or more consumers 606 may be selected from a plurality of consumers 640, in which media company 602 may broadcast one or more messages 628 regarding the one or more certificates to advertiser and plurality of consumers 640.

The one or more charities 608 may have a contractual arrangement with one or more of the retailer and/or advertiser 610, media company 602, and the cloud-based database 612. In some examples, retailer/advertiser 610 may enter into one or more contracts, including an advertising contract 626. The cloud-based database 612 may be configured to contract details with total certificate authorization based on the advertising contract 626. The cloud-based database 612 may be configured to pay media company 602 for the advertising. In addition, the media company 602 may be configured to exchange information on sales of the certificates through the cloud of the cloud-based database 612. In some examples, media company 602 may be in a contractual relationship with the cloud-based database 612. The one or more charities 608 may purchase or otherwise obtain the e-certificates at a discounted price and then sell the e-certificates as part of a campaign, such as a fund-raising initiative. After the e-certificate is exchanged and received by the customer 606, at least one of the one or more charities 608, cloud-based database 612, retailer 610, and/or media company 602 may each receive a portion of the amount spent, as explained below. As a consequence, the charities 608 that purchase, for example, e-certificates or gift cards at a discount for resale, no longer encounter or experience problems associated with substantial theft, loss, and record-keeping issues. In addition, the one or more charities 608 are now aware of which e-certificates were sold but not redeemed. The one or more charities 608 may negotiate to keep its portion of what was not redeemed after expiration of the e-certificate.

For example, upon issuance of a credit card, the consumer 606 may be enabled to utilize an e-certificate and the credit card simultaneously associated with a purchase by only presenting a single card. The credit card may be read by a device 604 including a POS device or reader, such as a credit card reader, as part of exchanging and processing data, including the credit card data. The data may be received by the cloud-based database 612 from the credit card reader. Validation of the e-certificate may occur between same or different devices, such as a first device and a second device, including a client or consumer device 606 and a merchant or retailer device 604. In some examples, one or more of the devices may comprise a mobile device, a tablet, desktop, or the like.

The cloud-based database 612 may be configured to receive transaction data and validate the e-certificate based thereon in order to authorize it. In some examples, transaction data may comprise transaction data from device 604, as previously described. Cloud-based database 612 may be configured to receive blockchain transaction data 624. The funds distribution may include one or more associated portions including but not limited to the media company 614, one or more charities 616, profits 618, credit card or electronic funds transfer fees paid out to a credit card company 620, and consumer savings 622. The portion associated with the consumer savings 622 may include one or more of (via an application programming interface) an account (such as, for example, a bank account, a Venmo account, a digital wallet, and/or the like), Roth IRA, 529 Plan, payoff college debt, investment account, and/or the like, and may be sent by the cloud-based database 612. In some examples, the consumer savings portion 622 may range from 10% to over 30%. The cloud-based database 612 may be configured to retain all funds until redemption of the e-certificate by the consumer 606. This benefits it by allowing interest to accrue until the redemption of the e-certificate by the consumer 606, and also allows it to retain or return the e-certificate purchase price. This disposition may depend on the marketing and/or financial decisions, as well as individual negotiations with at least one or more of the customer 606, one or more charities 608, retailers 610, and the media company 602.

Figure 7:
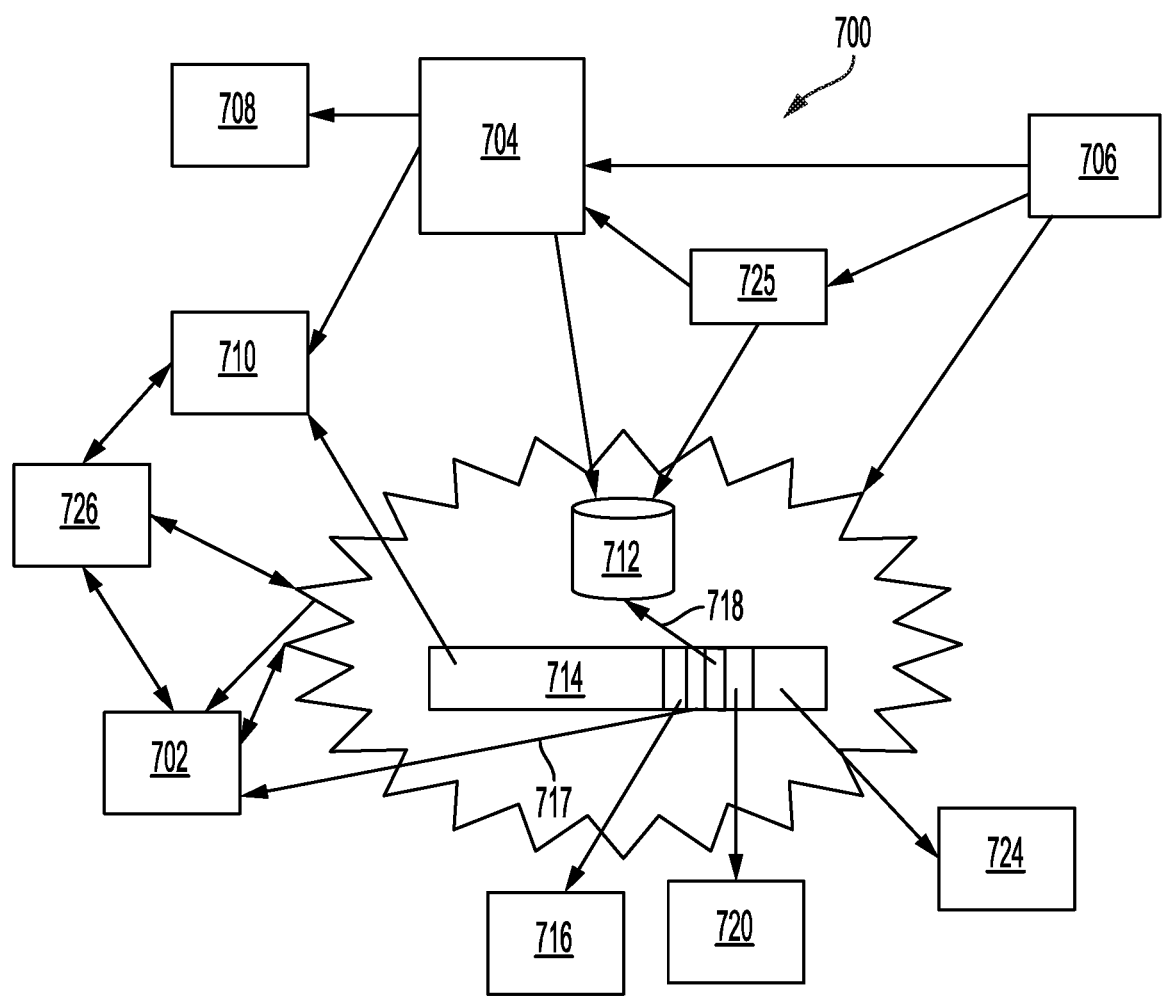
FIG. 7 illustrates a diagram of an e-certificate system according to another exemplary embodiment.

In the exemplary embodiment of FIG. 7, a system 700 is shown for processing one or more e-certificates through a company 702, such as a licensee other than a media company. In one example, the licensee may be a media company that serves a dual role, for example, as both a media company and getting others to participate in an assigned area, which may be, in some examples, other media companies, chambers, etc. to promote and develop the rewards or incentives program. At the point of purchase 704, the e-certificates may be exchanged, for example between one or more consumers 706 and one or more charities 708, for goods and/or services utilizing, by way of example, at least one or more of near field communication (NFC), QR, bar code, manual, and debit or credit card data transfer. In some examples, cloud-based database 712 may be configured to validate the certificate. Consumer 706 may be configured to purchase one or more certificates via one or more devices. Validation of the e-certificate may occur between same or different devices, such as a first device and a second device, including a client or consumer device and a merchant or retailer device. In some examples, one or more of the devices may comprise a mobile device, a tablet, desktop, or the like.

The one or more charities 708 may have a contractual arrangement with one or more of the retailer/advertiser 710, licensee 702, and the cloud-based database 712. In some examples, retailer 710 may enter into one or more contracts 726, including a contract with licensee 702. The cloud-based database 712 may be configured to contract details with total certificate authorization based on one or more contracts 726. In addition, licensee 702 may be in a contractual relationship with cloud-based database 712. The one or more charities 708 may purchase or otherwise obtain the e-certificates at a discounted price and then sell the e-certificates as part of a campaign, such as a fund-raising initiative. After the e-certificate is exchanged and received by the customer 706, at least one of the one or more charities 708, cloud-based database 712, retailer/advertiser 710, and/or licensee 702 may each receive a portion of the amount spent, as explained below. As a consequence, the charities 708 that purchase, for example, e-certificates or gift cards at a discount for resale, no longer encounter or experience problems associated with substantial theft, loss, and record-keeping issues. In addition, the one or more charities 708 are now aware of which e-certificates were sold but not redeemed. The one or more charities 708 may negotiate to keep its portion of what was not redeemed after expiration of the e-certificate.

The cloud-based database 712 may be configured to receive the transaction data and validate the e-certificate based thereon in order to authorize it. In some examples, transaction data may comprise data from device 704, as previously described. Cloud-based database 712 may be configured to receive blockchain data 725, as previously described, including but not limited to via one or more synchronous or asynchronous processes. The funds distribution may include one or more associated portions including but not limited to the retailer 714, one or more charities 716, licensee 717, profits 718, credit card or electronic funds transfer fees paid out to a credit card company 720, and consumer savings 724. The portion associated with the consumer savings 724 may include one or more of (via an API) bank account, Roth IRA, 529 Plan, payoff college debt, investment account, and the like, and may be sent by the cloud-based database 712. In some examples, the consumer savings portion 724 may range from 10% to over 30%. The cloud-based database 712 may be configured to retain all funds until redemption of the e-certificate by the consumer 706. This benefits it by allowing interest to accrue until the redemption of the e-certificate by the consumer 706, and also allows it to retain or return the e-certificate purchase price. This disposition may depend on the marketing and/or financial decisions, as well as individual negotiations with at least one or more of the customer 706, one or more charities 708, retailers 710, and the licensee 702.

Figure 8:
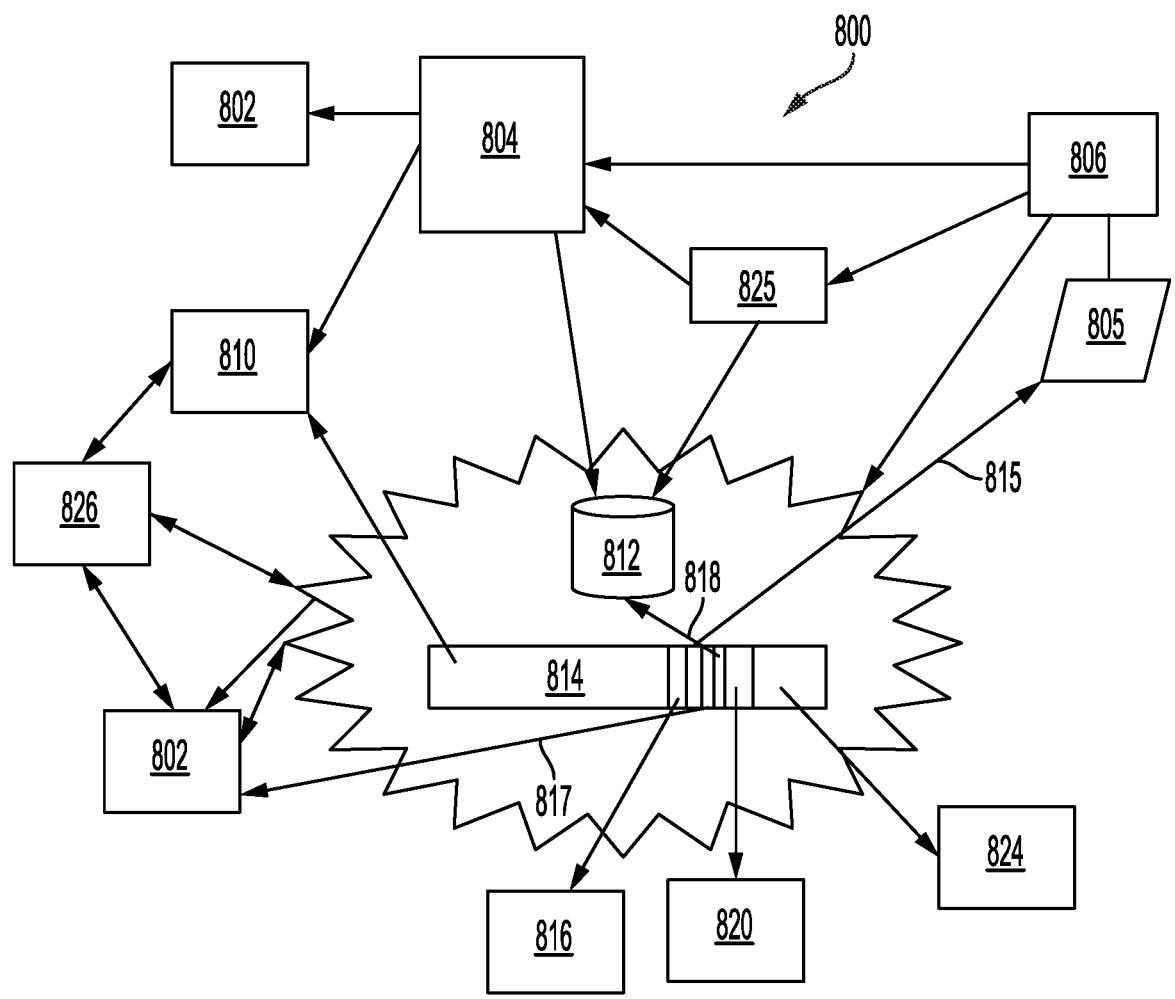
FIG. 8 illustrates a diagram of an e-certificate system with a rewards program according to an exemplary embodiment.

In the exemplary embodiment of FIG. 8, a system 800 is shown for processing one or more e-certificates through a company 802, such as a licensee other than a media company, with a rewards program, such as a buy local rewards program. At the point of purchase 804, the e-certificates are exchanged, for example between one or more consumers 806 and one or more charities 808, for goods and/or services utilizing, by way of example, at least one or more of near field communication (NFC), QR, bar code, manual, and debit or credit card data transfer. In some examples, cloud-based database 812 may be configured to validate the certificate. Consumer 806 may be configured to purchase one or more certificates via one or more devices. Validation of the e-certificate may occur between same or different devices, such as a first device and a second device, including a client or consumer device and a merchant or retailer device. In some examples, one or more of the devices may comprise a mobile device, a tablet, desktop, or the like.

The one or more charities 808 may have a contractual arrangement with one or more of the retailer/advertiser 810, licensee 802, and the cloud-based database 812. In some examples, retailer 810 may enter into one or more contracts 826, including a contract with licensee 802. Cloud-based database 812 may be configured to contract details with total certificate authorization based on one or more contracts 826. In addition, licensee 802 may be in a contractual relationship with cloud-based database 812. The one or more charities 808 may purchase or otherwise obtain the e-certificates at a discounted price and then sell the e-certificates as part of a campaign, such as a fund-raising initiative. After the e-certificate is exchanged and received by the customer 806, at least one of the one or more charities 808, cloud-based database 812, retailer/advertiser 810, and/or licensee 802 may each receive a portion of the amount spent, as explained below. As a consequence, the charities 808 that purchase, for example, e-certificates or gift cards at a discount for resale, no longer encounter or experience problems associated with substantial theft, loss, and record-keeping issues. In addition, the one or more charities 808 are now aware of which e-certificates were sold but not redeemed. The one or more charities 808 may negotiate to keep its portion of what was not redeemed after expiration of the e-certificate.

The cloud-based database 812 may be configured to receive the transaction data and validate the e-certificate based thereon in order to authorize it. In some examples, transaction data may comprise data from device 804 as previously described. Cloud-based database 812 may be configured to receive blockchain data 825, as previously described, including but not limited to via one or more synchronous or asynchronous processes. The funds distribution may include one or more associated portions, including but not limited to the retailer 814, one or more charities 816, cash or rewards 815, licensee 802, profits 818, credit card or electronic funds transfer fees paid out to a credit card company 820, and consumer savings 824. The portion associated with cash or rewards 815 may be associated with an account 805 that is linked to customer 806. The portion associated with the consumer savings 824 may include one or more of (via an API) bank account, Roth IRA, 529 Plan, payoff college debt, investment account, and the like, and may be sent by the cloud-based database 812. In some examples, the consumer savings portion 824 may range from 10% to over 30%. The cloud-based database may be configured to retain all funds until redemption of the e-certificate by the consumer. This benefits it by allowing interest to accrue until the redemption of the e-certificate by the consumer 806, and also allows it to retain or return the e-certificate purchase price. This disposition may depend on the marketing and/or financial decisions, as well as individual negotiations with at least one or more of the customer 806, one or more charities 808, retailers 810, and the licensee 802.

Figure 9:
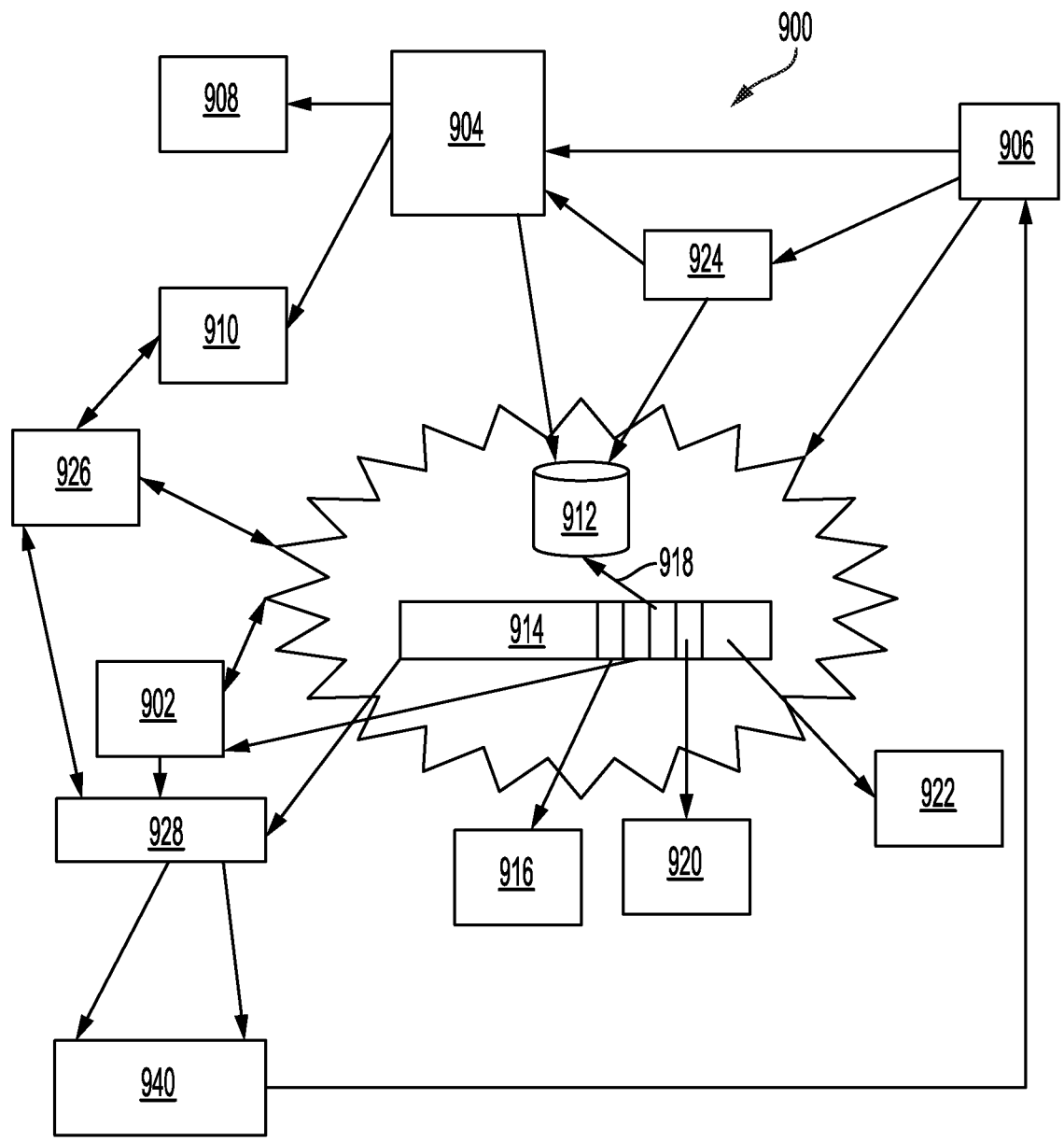
FIG. 9 illustrates a diagram of an e-certificate system according to another exemplary embodiment.

In the exemplary embodiment of FIG. 9, a system 900 is shown for processing one or more e-certificates through a licensee 902 other than a media company, in exchange for a service or product. At the point of purchase 904, the e-certificates may be exchanged, for example between one or more consumers 906 and one or more charities 908, for goods and/or services utilizing, by way of example, at least one or more of near field communication (NFC), QR, bar code, manual, and debit or credit card data transfer. In some examples, cloud-based database 912 may be configured to validate the certificate. Consumer 906 may be configured to purchase one or more certificates via one or more devices. In some examples, one or more consumers 906 may be selected from a plurality of consumers 940, in which media company 903 may broadcast one or more messages 928 regarding the one or more certificates to advertiser and a plurality of consumers 940. Validation of the e-certificate may occur between same or different devices, such as a first device and a second device, including a client or consumer device and a merchant or retailer device. In some examples, one or more of the devices may comprise a mobile device, a tablet, desktop, or the like.

The one or more charities 908 may have a contractual arrangement with one or more of the retailer/advertiser 910, licensee 902, media company 903, and the cloud-based database 912. In some examples, advertiser/retailer 910 may enter into one or more contracts, including an advertising contract 926. The cloud-based database 912 may be configured to contract details with total certificate authorization based on advertising contract 926. Licensee 902 may be configured to sublicense to media company 928. Licensee 902 may have a contractual relationship with cloud-based exchange 912. The one or more charities 908 may purchase or otherwise obtain the e-certificates at a discounted price and then sell the e-certificates as part of a campaign, such as a fund-raising initiative. After the e-certificate is exchanged and received by the customer 906, at least one of the one or more charities 908, cloud-based database 912, retailer 910, media company 928, and/or licensee 902 may each receive a portion of the amount spent, as explained below. As a consequence, the charities 908 that purchase, for example, e-certificates or gift cards at a discount for resale, no longer encounter or experience problems associated with substantial theft, loss, and record-keeping issues. In addition, the one or more charities 908 are now aware of which e-certificates were sold but not redeemed. The one or more charities 908 may negotiate to keep its portion of what was not redeemed after expiration of the e-certificate.

The cloud-based database 912 may be configured to receive the transaction data and validate the e-certificate based thereon in order to authorize it. In some examples, transaction data may comprise transaction data from device 904, as previously described above. Cloud-based database 912 may be configured to receive blockchain transaction data 924, as previously described, including but not limited to via one or more synchronous or asynchronous processes. The funds distribution may include one or more associated portions including but not limited to the media company 914, one or more charities 916, licensee 902, profits 918, credit card or electronic funds transfer fees paid out to a credit card company 920, and consumer savings 922. The portion associated with the consumer savings 922 may include one or more of (via an API) bank account, Roth IRA, 529 Plan, payoff college debt, investment account, and the like, and may be sent by the cloud-based database 912. In some examples, the consumer savings portion 922 may range from 10% to over 30%. The cloud-based database 912 may be configured to retain all funds until redemption of the e-certificate by the consumer 906. This benefits it by allowing interest to accrue until the redemption of the e-certificate by the consumer 906, and also allows it to retain or return the e-certificate purchase price. This disposition may depend on the marketing and/or financial decisions, as well as individual negotiations with at least one or more of the customer 906, one or more charities 908, retailers/advertisers 910, licensee 902, and the media company 928.

Figure 10:
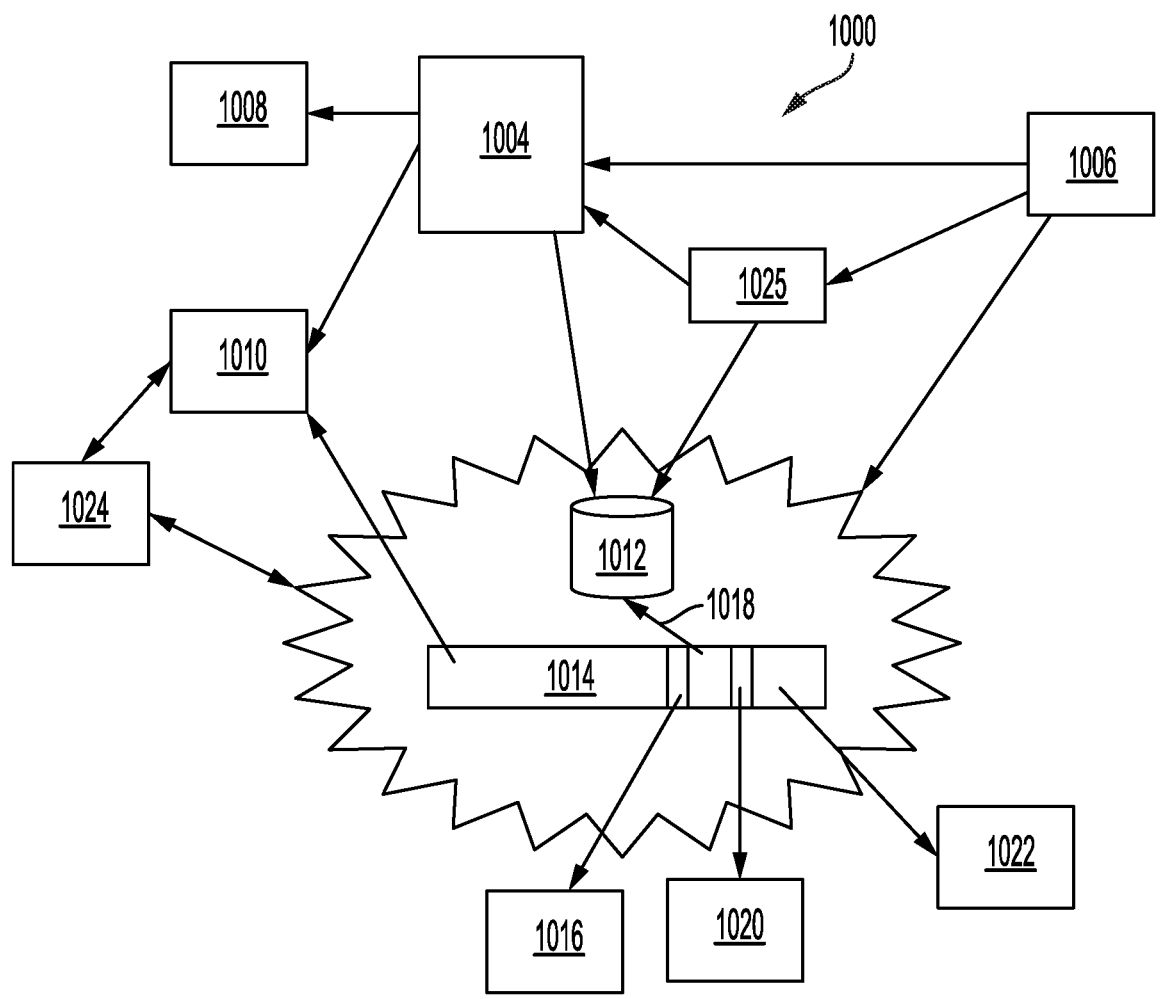
FIG. 10 illustrates a diagram of an e-certificate system according to another exemplary embodiment.

In the exemplary embodiment of FIG. 10, a system 1000 is shown for processing one or more e-certificates direct to a retailer and consumer. At the point of purchase 1004, the e-certificates may be exchanged, for example between one or more consumers 1006 and one or more charities 1008, for goods and/or services utilizing, by way of example, at least one or more of near field communication (NFC), QR, bar code, manual, and debit or credit card data transfer. In some examples, cloud-based database 1012 may be configured to validate the certificate. Consumer 1006 may be configured to purchase one or more certificates via one or more devices. Validation of the e-certificate may occur between same or different devices, such as a first device and a second device, including a client or consumer device and a merchant or retailer device. In some examples, one or more of the devices may comprise a mobile device, a tablet, desktop, or the like.

The one or more charities 1008 may have a contractual arrangement with one or more of the retailer/advertiser 1010 and the cloud-based database 1012. In some examples, retailer 1010 may enter into one or more contracts 1024, including a contract with cloud-based database 1012. Cloud-based database 1012 may be configured to contract details with total certificate authorization based on one or more contracts 1024. By way of example, the one or more charities 1008 may purchase or otherwise obtain the e-certificates at a discounted price and then sell the e-certificates as part of a campaign, such as a fund-raising initiative. After the e-certificate is exchanged and received by the customer 1006, at least one of the one or more charities 1008, cloud-based database 1012, and the retailer 1010 may each receive a portion of the amount spent, as explained below. As a consequence, the charities 1008 that purchase, for example, e-certificates or gift cards at a discount for resale, no longer encounter or experience problems associated with substantial theft, loss, and record-keeping issues. In addition, the one or more charities 1008 are now aware of which e-certificates were sold but not redeemed. The one or more charities 1008 may negotiate to keep its portion of what was not redeemed after expiration of the e-certificate.

The cloud-based database 1012 may be configured to receive the transaction data and validate the e-certificate based thereon in order to authorize it. In some examples, transaction data may comprise data received from device 1004, as previously described. Cloud-based database 1012 may be configured to receive blockchain data 1025, as previously described, including but not limited to via one or more synchronous or asynchronous processes. The funds distribution may include one or more associated portions including but not limited to the retailer 1014, one or more charities 1016, profits 1018, credit card or electronic funds transfer fees paid out to a credit card company 1020, and consumer savings 1022. The portion associated with the consumer savings 1022 may include one or more of (via an API) bank account, Roth IRA, 529 Plan, payoff college debt, investment account, and the like, and may be sent by the cloud-based database 1012. The cloud-based database 1012 may be configured to retain all funds until redemption of the e-certificate by the consumer 1006. This benefits it by allowing interest to accrue until the redemption of the e-certificate by the consumer 1006, and also allows it to retain or return the e-certificate purchase price. This disposition may depend on the marketing and/or financial decisions, as well as individual negotiations with at least one or more of the customer 1006, one or more charities 1008, and retailers 1010.

In some examples, the cloud-based database may include one or more servers coupled to one or more databases and the blockchain, and may be configured to store and generate data that may be communicated wirelessly to various components of the system in accordance with the systems and methods described above. For example, asynchronous purchase and redemption may take place with respect to the certificate and blockchain and consumer and POS device.

Figure 11:
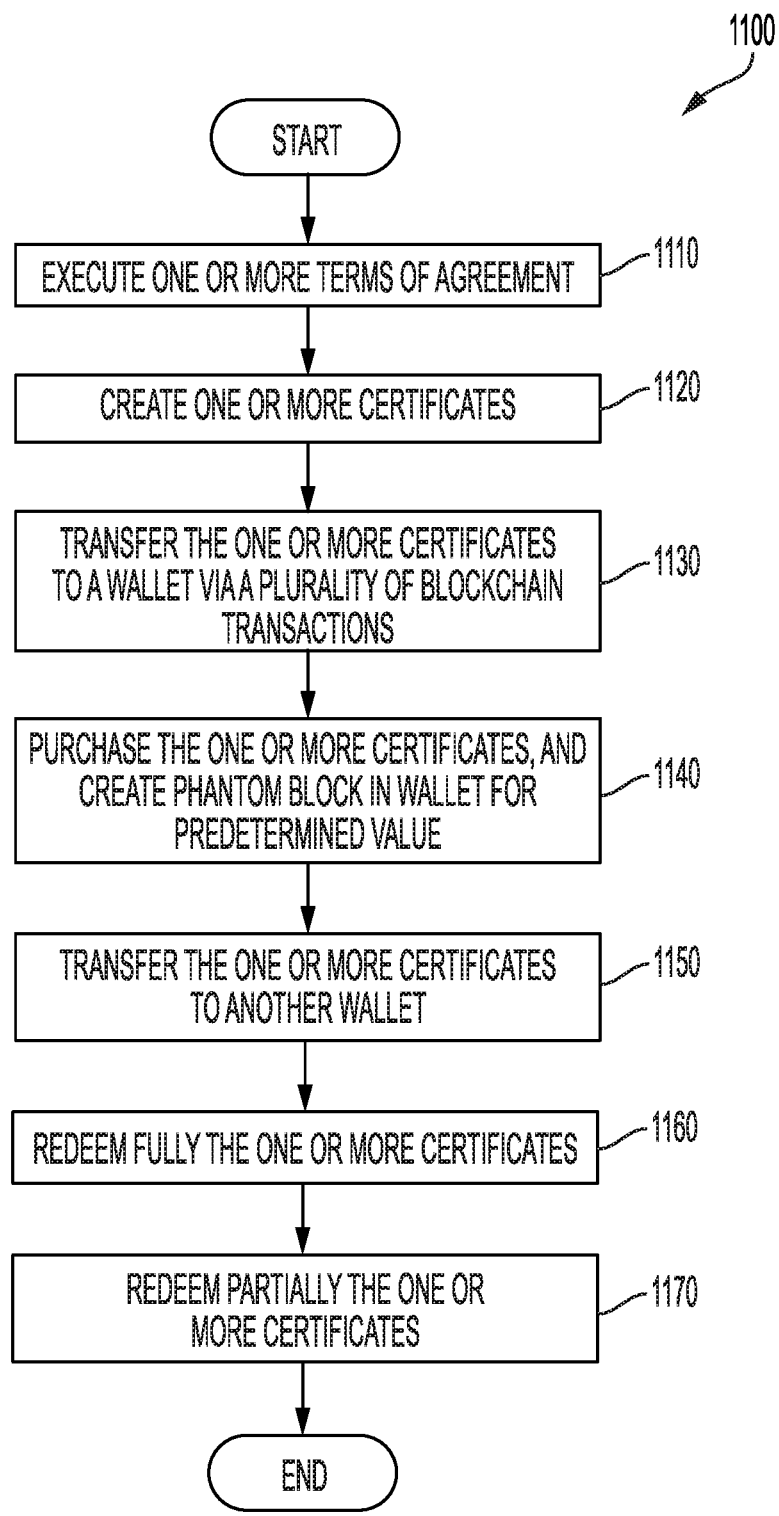
FIG. 11 illustrates a diagram of a process according to an exemplary embodiment.

In the exemplary embodiment of FIG. 11, a process 1100 is shown illustrating blockchain configuration and certificate transfer. FIG. 11 may reference same or similar structure and functions as described above with respect to any of the previously described figures. At block 1110, a media company and merchant may agree to perform one or more terms of a contract. In other examples, other entities may agree to perform one or more terms of a contract. At block 1120, one or more certificates may be created on a wallet associated with one or more servers. At block 1130, the one or more certificates may be transferred, in some examples instantaneously, to the media company wallet. In some examples, the media company wallet account may contain certificates from a plurality of merchants. In some examples, this may comprise a single blockchain or a plurality of blockchain transactions. At block 1140, the consumer may purchase one or more certificates, which may be created or moved to the consumer wallet account. At block 1150, the consumer may transfer one or more certificates to another consumer wallet account. In some examples, this transfer may occur more than once. At block 1160, redemption of the one or more certificates may take place. In some examples, full or partial redemption may occur, as explained above. For example, partial redemption may continue to block 1170. At block 1170, a partial certificate may be transferred to another consumer. In other examples, full and/or final redemption may occur such that the one or more certificates ends in the merchant wallet. Referring back to block 1140, a phantom or ghost charity block may be created in a wallet account associated with one or more charities that is determined by the consumer, as previously explained. In some examples, this value may comprise a percentage of the purchase, such as 80%.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. While the current application recites particular combinations of features in the various embodiments discussed herein, various embodiments of the invention relate to any combination of any of the features described herein, and any such combination of features may be claimed in this or future applications. Any of the features, elements, or components of any of the exemplary embodiments discussed above may be claimed alone or in combination with any of the features, elements, or components of any of the other embodiments discussed above.

Although only a few embodiments have been described in detail in this disclosure, many modifications are possible (e.g., variations in sizes, dimensions, structures, shapes and proportions of the various elements, values of parameters) without materially departing from the novel teachings and advantages of the subject matter described herein. Further, actual dimensions not expressly set out in this description can be determined by using the ratios of dimensions measured in the Figures in combination with the express dimensions set out in this description. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. Although an embodiment of the invention and its advantages are described in detail, a person skilled in the art could make various alterations, additions, and omissions without departing from the spirit and scope of the present invention as defined by the appended claims.

What is claimed is:

1. A computer readable non-transitory medium comprising computer-executable instructions that are executed on a processor and comprising the steps of:
    establishing communication between a first device including one or more processors and memory and a second device including one or more processors and memory, wherein the first device is configured to purchase one or more certificates by a first process via one or more blockchain transactions;
    redeeming, by the second device, the one or more certificates received from the first device by a second process via one or more blockchain transactions, wherein the second process is triggered by creation of an unsettled transaction, the second process comprising an asynchronous process based on a plurality of states of connectivity;
    exchanging, by the second device, one or more codes to designate the one or more certificates as used on the first device; and
    generating, by one or more servers in communication with the second device, a message containing updated redemption information of the one or more certificates when the updated redemption information has been stored in one or more databases, the one or more databases in communication with the one or more servers.

2. The computer readable non-transitory medium of claim 1, further comprising prohibiting, by the one or more servers, repeat redemption of the one or more certificates.

3. The computer readable non-transitory medium of claim 1, wherein one or more of the first and second devices are configured to receive information about a plurality of states of the purchase.

4. The computer readable non-transitory medium of claim 3, wherein the plurality of states comprises a pending state, a redeemable state, a failed state, or an error state.

5. The computer readable non-transitory medium of claim 1, wherein the message is transmitted to the first device and the second device so as to provide access to the updated redemption information.

6. The computer readable non-transitory medium of claim 1, wherein the one or more servers comprises a central exchange server.

7. The computer readable non-transitory medium of claim 1, wherein the one or more databases comprises a cloud-based storage.

8. The computer readable non-transitory medium of claim 1, wherein the first device is configured to purchase the one or more certificates through a mobile application.

9. The computer readable non-transitory medium of claim 1, wherein at least one of one or more certificates that is purchased is restricted to purchase through a web-browser process.

10. The computer readable non-transitory medium of claim 1, wherein the second device is configured to redeem the one or more certificates through an image, data entry, wireless, or wired communication, or any combination thereof.

11. The computer readable non-transitory medium of claim 1, wherein the first process comprises an asynchronous process.

12. The computer readable non-transitory medium of claim 1, wherein the first process comprises a synchronous process.

13. The computer readable non-transitory medium of claim 1, wherein the second process comprises a synchronous process.

\* \* \* \* \*